United States Patent
Takahashi et al.

(10) Patent No.: US 6,884,164 B2
(45) Date of Patent: Apr. 26, 2005

(54) NETWORK GAME PROGRESS CONTROL SYSTEM, NETWORK GAME PROGRESS CONTROL METHOD, NETWORK GAME PROGRESS CONTROL PROGRAM, AND RECORDING MEDIUM STORING NETWORK GAME PROGRESS CONTROL PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 207 days.

(21) Appl. No.: 10/179,326

(22) Filed: Jun. 25, 2002

(65) Prior Publication Data

US 2003/0003977 A1 Jan. 2, 2003

(30) Foreign Application Priority Data

Jun. 28, 2001 (JP) .................................... 2001-196812

(51) Int. Cl.$^7$ ................................................ A63F 9/24
(52) U.S. Cl. ...................................................... 463/2
(58) Field of Search ........................... 463/40–42, 3–4, 463/1–2, 7, 30–31, 36, 46; 273/317–317.6, 236–237, 459–461

(56) References Cited

U.S. PATENT DOCUMENTS 5,538,255 A  7/1996  Barker
6,134,590 A * 10/2000  Perlman ........................ 463/42
2002/0128065 A1 * 9/2002  Chung et al. .................. 463/42

FOREIGN PATENT DOCUMENTS

| JP | 11-347254 | 12/1999 |
| JP | 2000-254354 | 9/2000 |
| JP | 2001-017736 | 1/2001 |
| JP | 2001-149658 | 6/2001 |
| WO | WO 96/25989 | 8/1996 |
| WO | WO 98/14886 | 4/1998 |
| WO | WO 99/32990 | 7/1999 |

* cited by examiner

*Primary Examiner*—Mark Sager

(74) *Attorney, Agent, or Firm*—Jordan and Hamburg LLP

(57) ABSTRACT

The present invention provides a network game progress control system which is capable of causing a network game between users to progress smoothly without being subject to effects caused by a data transfer rate disparity and/or a difference in hardware capacity. The pitcher-side client computer 2*a* transmits ball-type information and course information to the batter-side client computer 2*b*, causes a pitching action of the pitcher character to be temporarily suspended, and, after receiving batting information transmitted from the batter-side client computer 2*b*, restarts the pitching action of the pitcher character, and causes a baseball game to progress in accordance with a batting action determined by the batting information.

10 Claims, 14 Drawing Sheets

NETWORK GAME PROGRESS CONTROL SYSTEM, NETWORK GAME PROGRESS CONTROL METHOD, NETWORK GAME PROGRESS CONTROL PROGRAM, AND RECORDING MEDIUM STORING NETWORK GAME PROGRESS CONTROL PROGRAM

BACKGROUND OF THE INVENTION

1. Field of the Invention

The present invention relates to a network game progress control system, a network game progress control method, a network game progress control program which control the progress of a network game which users play in a game space, and a recording medium which stores such a game progress control program.

2. Description of the Related Art

In recent years, as use of the Internet has become widespread and data transfer rates have increased, network games have generally been played using terminal devices used by users and a network game server device, which are connected via the Internet. As such network games, a variety of competitive games such as sports and fighting games are played.

When these competitive games are played, because the Internet is used, unspecified multiple users can participate in the game as players. Therefore, when unknown people compete, since the abilities and so forth of opponents in relation to a game are not known, in comparison with ordinary games in which a competition is held with game devices as opponents by employing these game devices as stand alone game devices, game progress can be afforded a surprise quality and it is possible to provide the game with a certain appeal.

However, when data such as that required for game progress is transferred using the Internet, data transfer rates vary depending on the communication line which users use, for example CATV (Cable Television), ADSL (Asymmetric Digital Subscriber Line), ISDN (Integrated Services Digital Network), and on the types of modem used, and, as a result of a disparity in data transfer rates, user operations are not reflected immediately in game progress, and advantages and disadvantages are produced with respect to the state of progress of the game.

Further, also depending on the capacities of the personal computers or the like employed by users as terminal devices, user operations are not reflected immediately in game progress, meaning that advantages and disadvantages are produced with respect to the state of progress of the game on account of differences in hardware capacity.

Accordingly, when a competitive game is played between users when such a data transfer rate disparity and/or hardware capacity difference have not been dealt with, a user that uses a terminal device with a slow data transfer rate and a low hardware capacity is then unable to adequately demonstrate his or her own skill in the game itself. Consequently, the user cannot sustain his or her original interest in the network game, and becomes less interested in participating, meaning that it becomes impossible to smoothly manage the network game.

SUMMARY OF THE INVENTION

In order to resolve the above problems, it is an object of the present invention to provide a network game progress control system, a network game progress control method and a network game progress control program which are capable of causing a network game between users to progress smoothly without being subject to effects caused by a data transfer rate disparity and/or a difference in hardware capacity.

In order to achieve the above object, the present invention relates to a network game progress control system, which causes a network game played in a game space by users to progress, comprising: a first terminal device, which is used by a first user; a second terminal device, which is used by a second user different from the first user; and a network game server device, which is communicably connected via a network with the first and second terminal devices, and which controls progress of a game played in a game space by the first and second users using the first and second terminal devices, wherein the first terminal device comprises first game progress means that causes a game to progress in accordance with a first progress state determined by first event information for determining a game progress state; and first event information transmission means which transmits the first event information to the network game server device; the network game server device comprises event information transfer means which transfers first event information, which is transmitted by the first event information transmission means, to the second terminal device; the second terminal device comprises first event information reception means which receives first event information transferred by the event information transfer means; second game progress means which causes a game to progress in accordance with a second progress state determined by second event information for determining the next game progress state after the game has been caused to progress in accordance with the first progress state determined by the first event information received by the first event information reception means; and second event information transmission means which transmits the second event information to the network game server device; the event information transfer means transfers second event information, which is transmitted by the second event information transmission means, to the first terminal device; the first terminal device further comprises second event information reception means which receives second event information transferred by the event information transfer means; and the first game progress means causes a game to progress such that the first progress state does not end until the second event information reception means receives the second event information, and causes a game to progress in accordance with the second progress state after the second event information reception means receives the second event information.

According to the present invention described in the above, the network game progress control system, which controls progress of a network game played in a game space by users, comprises a first terminal device, which is used by a first user; a second terminal device, which is used by a second user different from the first user; and a network game server device, which is communicably connected via a network with the first and second terminal devices, and which controls the progress of a game played in a game space by the first and second users using the first and second terminal devices.

The first terminal device comprises first game progress means that causes a game to progress in accordance with a first progress state determined by first event information for determining a game progress state; and first event information transmission means which transmits the first event information to the network game server device. The network game server device comprises event information transfer means which transfers first event information, which is transmitted by the first event information transmission means, to the second terminal device. The second terminal device comprises first event information reception means which receives first event information transferred by the event information transfer means; second game progress means which causes a game to progress in accordance with a second progress state determined by second event information for determining the next game progress state after the game has been caused to progress in accordance with the first progress state determined by the first event information received by the first event information reception means; and second event information transmission means which transmits the second event information to the network game server device.

The event information transfer means comprised by the network game server device transfers second event information, which is transmitted by the second event information transmission means, to the first terminal device. The first terminal device further comprises second event information reception means which receives second event information transferred by the event information transfer means, and the first game progress means causes a game to progress such that the first progress state does not end until the second event information reception means receives the second event information, and causes a game to progress in accordance with the second progress state, which is determined by second event information, after the second event information reception means receives the second event information.

In other words, in the first terminal device, the game is caused to progress in accordance with a first progress state determined by first event information for determining a game progress state, first event information is transmitted from the first terminal device to the network game server device, and the first event information thus transmitted is transferred from the network game server device to the second terminal device.

At this time, in the second terminal device, first event information, which is transferred from the network game server device, is received; the game is caused to progress in accordance with a second progress state determined by second event information for determining the next game progress state, after the game has been caused to progress in accordance with the first progress state determined by the received first event information; second event information is transmitted to the network game server device; and transmitted second event information is transferred from the network game server device to the first terminal device.

Meanwhile, in the first terminal device, the game is caused to progress such that the first progress state does not end until the second event information is received, and the game is caused to progress in accordance with the second progress state determined by the second event information after the second event information is received.

Consequently, even if there is a variation between the time for the transfer of first event information from the first terminal device to the second terminal device and the time for the transfer of second event information from the second terminal device to the first terminal device, which is caused by a difference in capacity between the first and second terminal devices and/or by a disparity in the data transfer rates of the communication lines used by the first and second terminal devices, in the first and second terminal devices, after the game is caused to progress in accordance with the first progress state, the game is caused to progress in accordance with the second progress state.

These and other objects, features and advantages of the present invention will become more apparent upon reading the following detailed description along with the accompanied drawings.

DESCRIPTION OF THE PREFERRED EMBODIMENTS

Figure 1:
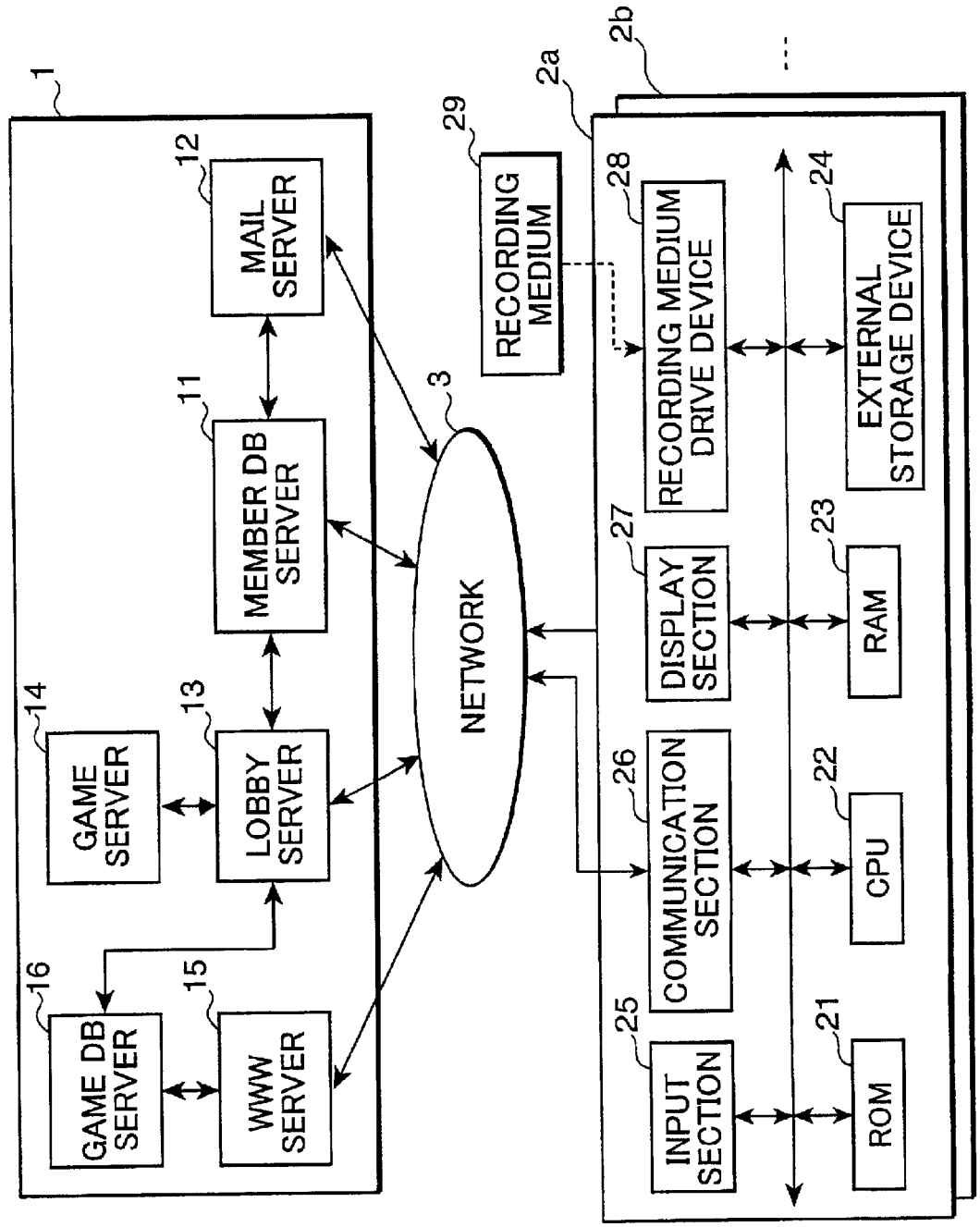
FIG. 1 is a block diagram showing the constitution of the network game system according to a first embodiment of the present invention.

A description will be provided hereinbelow, with reference to the drawings, of a network game system that is an example of the network game progress control system according to the first embodiment of the present invention. FIG. 1 is a block diagram showing the constitution of the network game system according to one embodiment of the present invention.

In the description below, the description is with regard to a baseball game in which pre-registered members compete, which constitutes one example of a network game. However, the present invention is not limited to this example in particular. A network game in which a competition takes place between users can be applied to a variety of games, and can, for example, be similarly applied to sports games, fighting games, simulation games, shooting games, role-playing games, and other games.

The network game system shown in FIG. 1 comprises a server system 1 and a plurality of client computers 2a, 2b. The server system 1 and plurality of client computers 2a, 2b are connected so as to be capable of communicating mutually via a network 3. The client computers 2a, 2b are terminal devices used by members who are users, and server system 1 is a network game server device for managing a baseball game played in a game space by members using client computers 2a, 2b.

For the network 3, the Internet may be used for example, such that a variety of information and the like can be mutually transmitted and received between the server system 1 and the client computers 2a, 2b in accordance with the TCP/IP (Transmission Control Protocol/Internet Protocol). The network 3 is not limited to the Internet in particular; it is also possible to use another network such as an intranet, or a network in which a variety of networks such as the Internet and intranets are combined, or the like. Furthermore, the server system 1 and the client computers 2a, 2b may also be mutually connected by means of a dedicated line.

Further, when the Internet is used as the network 3, normally, there are many cases where each of the client computers 2a, 2b is connected via a modem or similar to a predetermined provider server and connected via this provider server to the network 3. However, in order to simplify the description, an illustration of such a provider server and a description thereof have been omitted.

In the present embodiment, users that use the client computers 2a, 2b are members who have registered to receive a predetermined service which is provided by a company that manages network games, and a net competition (or net game) is conducted by means of a baseball game in which a batter character bats a ball object (equivalent to a ball in a real baseball game) pitched by a pitcher character as a result of a member using the client computer 2a operating a pitcher character (equivalent to a pitcher in a real baseball game) in a game space and a member using the client computer 2b operating a batter character (equivalent to a batter in a real baseball game) in the same game space, for example.

Here, net competitions include a normal competition and an encounter league. The normal competition is a profile switching optional competition in which the exchange of profile information between opponents can be optionally performed, and the encounter league is a competition with profile exchange in which the exchange of profile information between opponents is invariably performed.

The members optionally access the server system 1 using the client computers 2a, 2b and are able to conduct a normal competition and an encounter league in a game space constructed by the server system 1 and the client computers 2a, 2b, similarly to an ordinary baseball game.

Next, the server system 1 will be described in detail. The server system 1 comprises a member DB (database) server 11, mail server 12, lobby server 13, game server 14, WWW (World Wide Web) server 15, and game DB server 16. The servers are connected by means of a predetermined network such as a LAN (Local Area Network), for example, so as to be at least capable of transmitting and receiving data and the like via a route like that illustrated. Further, the member DB server 11, mail server 12, lobby server 13, and WWW server 15, are connected to the network 3 via a communication device (omitted from the drawings) such as a router, for example.

The member DB server 11 is constituted from an ordinary database server device or similar, and performs user member registration processing and the like when a user registers as a member in order to receive a predetermined service which is provided by a company that manages network games. Further, the member DB server 11 manages member IDs, passwords, billing information, and the like, for each member, which are determined during member registration, by storing same in a database. The mail server 12 is constituted from an ordinary mail server device or similar, and manages the electronic mail of each member.

The lobby server 13 is constituted from an ordinary server device or similar, and performs processing of various lobbies constituting portal sites when a network game is played. For example, when members use the client computers 2a, 2b to gain access in order to play a network game, the lobby server 13 performs authentication processing of accessing members by referencing member IDs, passwords, or the like, which are stored on the member DB server 11.

Furthermore, the lobby server 13 performs guidance processing to guide a member, who has been confirmed by authentication processing to be a legitimate member, to a lobby selected by this member from among a plurality of lobbies, and, to guide the member, in the lobby to which the member has been guided, to a competition area selected by this member from among a plurality of competition areas, such that a competition is conducted in the game space of the competition area to which the member has been guided.

The game server 14 is constituted from an ordinary server device or similar, and performs network game progress processing for causing a network game to progress in the game space in which members are conducting a competition, and transmits data required for progress of the network game, and the like, via the lobby server 13 to the client computers 2a, 2b.

For example, after a game has started, the game server 14 uses the lobby server 13 to transfer pitch information, which is first event information that has been transmitted from the client computer 2a, to the client computer 2b, and to transfer batting information, which is second event information that has been transmitted from the client computer 2b, to the client computer 2a.

Here, event information is information for determining the game progress state, where pitch information is information for determining the movement of a ball object pitched by a pitcher character, and batting information is information for determining the batting result of a batter character.

In the present embodiment, ball-type information for determining the ball type of the ball object pitched by the pitcher character, and course information for determining the course, or the like, is employed as pitch information, for example.

Further, information which is employed as batting information is hit information, which indicates that the batter character has batted a hit by hitting or bunting; out information, which indicates an out resulting from hitting or bunting by the batter character; ball information, which indicates that a pitch judgment after the batter character has allowed a ball object to pass is a ball; strike information, which indicates that a pitch judgment after the batter character has allowed a ball object to pass is a strike; dead ball information, which indicates a dead ball after the batter character allows a ball object to pass and the ball object hits the batter character; miss strike information, which indicates a strike after the batter character misses, and other information.

Further, event information is not limited to the above examples in particular, it being possible to use a variety of event information in accordance with the subject-matter of the network game, and the number of items of information is not limited to the two mentioned above in particular, it also being possible to use three or more items of event information. Furthermore, pitch information and batting information are also not limited to the above examples, it being possible to use other information relating to pitch details and batting results.

The game DB server 16 is constituted from an ordinary database server device or the like and manages all types of information relating to a network game, such as game results or similar which are transmitted by the client computers 2a, 2b via the lobby server 13, by storing this information in a database.

The WWW server 15 is constituted from an ordinary WWW server device or the like, and creates ranking data or similar from the game results data or other data stored on the game DB server 16, displays ranking data or similar thus created on a predetermined home page, and is in a state where ranking data or similar can be viewed from the client computers 2a, 2b and the like.

Next, a detailed description for the client computers 2a, 2b will be provided. Each of the client computers 2a, 2b is constituted from an ordinary personal computer or similar, and comprises a ROM (read-only memory) 21, a CPU (central processing unit) 22, a RAM (random access memory) 23, an external storage device 24, an input section 25, a communication section 26, a display section 27, and a recording medium drive device 28.

Each of the above blocks in the client computers 2a, 2b is connected to an internal bus, and a variety of data and the like can be inputted and outputted within the client computers 2a, 2b via this bus and various processing to perform a network game is executed under the control of the CPU 22.

Basic programs for operating the client computers 2a, 2b, or similar, are pre-stored in the ROM 21. The RAM 23 is used as a work area for the CPU 22, or similar. A recording medium 29 is a computer readable recording medium, and is constituted by a CD-ROM, for example. This CD-ROM is provided by a software manufacturer or similar that creates network games, a client-side game progress program allowing members to play a baseball game in a game space, and the like, being stored on this CD-ROM.

The recording medium drive device 28 is constituted from a CD-ROM drive or similar, and, under the control of the CPU 22, the client-side game progress program is read out from the recording medium 29, and the client-side game progress program is installed in the external storage device 24.

The recording medium 29 is not limited to the above example in particular, and when another recording medium drive device such as a DVD drive or floppy disk drive are added, it is also possible to install a client-side game progress program or similar in the external storage device 24 by using another computer-readable recording medium such as a DVD or floppy disk. Further, when a client-side game progress program or similar is downloadable via the network 3 from a software manufacturer home page or the like, the client-side game progress program or similar may also be downloaded directly from this home page to the external storage device 24.

The external storage device 24 is constituted from an external storage device such as a hard disk drive. As above, the client-side game progress program is installed on the external storage device 24, and a variety of programs such as a moving image playback program for playing back three-dimensional moving images in accordance with the game progress program are pre-installed on the external storage device 24 using ordinary methods. DirectX by Microsoft, or the like, can be used as the moving image playback program, for example.

The CPU 22 reads out basic programs and the like from the ROM 21, reads out a client-side game progress program and a moving image playback program from the external storage device 24, executes network game progress control processing for causing an action to progress in which a batter character bats a ball object pitched by a pitcher character in a normal competition and an encounter league, and transmits and receives required data and the like to and from the server system 1 using the communication section 26. Further, the CPU 22 reads out a frame rate control program, which is comprised by the client-side game progress program, from the external storage device 24, and executes frame rate control processing for controlling the frame rate of the game screens displayed in the normal competition and the encounter league.

The input section 25 is constituted from a keyboard and a mouse, or similar, and, in the present embodiment, a variety of commands or similar are inputted in accordance with user operation mainly by using the mouse. The communication section 26 is constituted from a modem or a router, or the like, and controls communications with the server system 1 via the network 3. The display section 27 is constituted from a CRT (cathode ray tube) or liquid crystal display device or similar, and, under the control of the CPU 22, a variety of screens used in the network game are displayed by means of still images or moving images.

Figure 2:
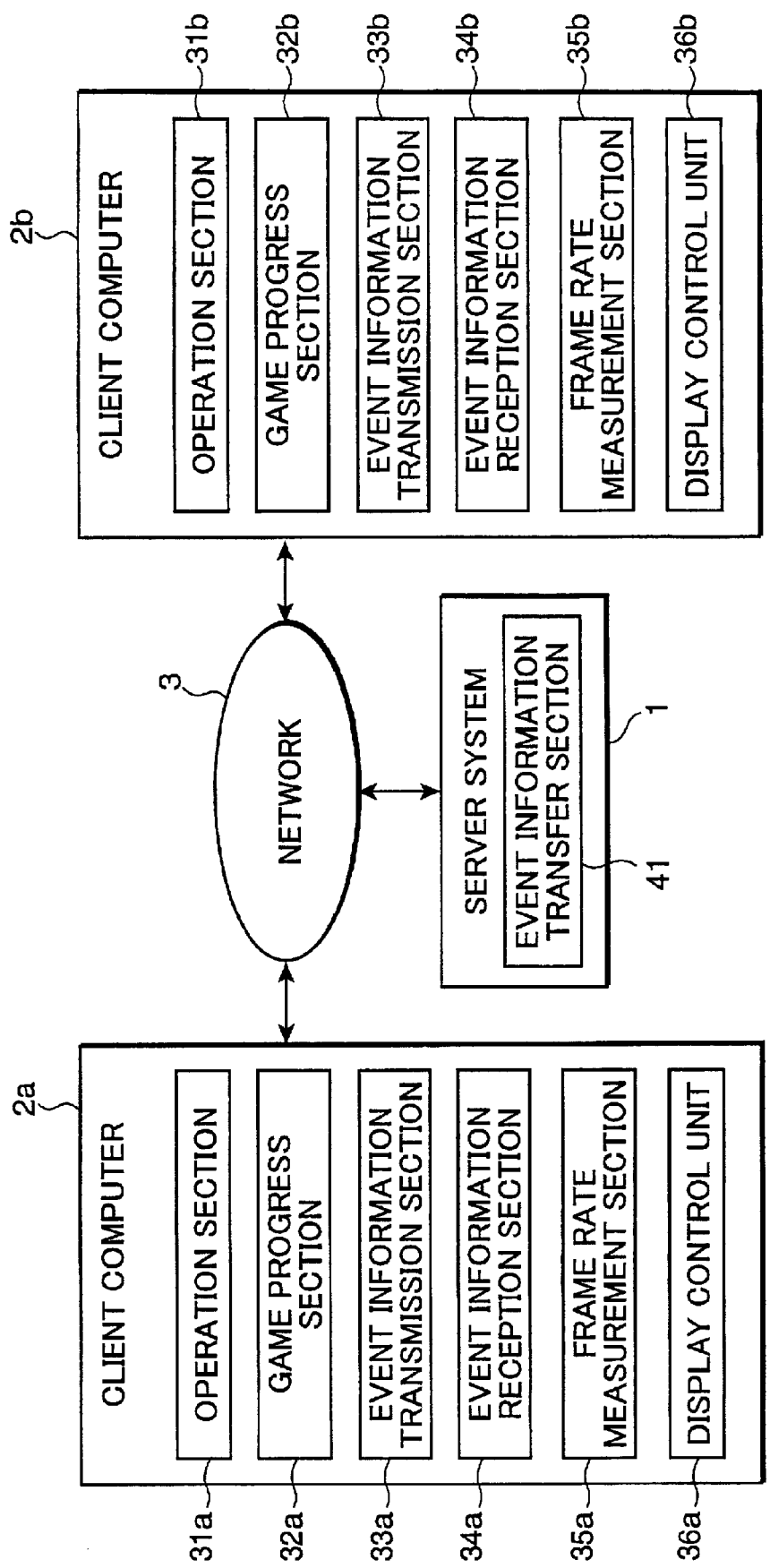
FIG. 2 shows essential function blocks for the network game system shown in FIG. 1.

Next, the essential functions of the network game system constituted as above will be described. FIG. 2 shows essential function blocks for the network game system shown in FIG. 1. In the following description, it is assumed that a pitcher-side member uses the client computer 2a to operate a pitcher character, and that a batter-side member uses the client computer 2b to operate a batter character.

As shown in FIG. 2, the client computer 2a functionally comprises an operation section 31a, a game progress section 32a, an event information transmission section 33a, an event information reception section 34a, a frame rate measurement section 35a, and a display control unit 36a. Similarly, the client computer 2b functionally comprises an operation section 31b, a game progress section 32b, an event information transmission section 33b, an event information reception section 34b, a frame rate measurement section 35b, and a display control unit 36b. The server system 1 functionally comprises an event information transfer section 41.

As a result of the CPU 22 reading out and executing a client-side game progress program or similar which is recorded on the recording medium 29, the client computers 2a, 2b function as operation sections 31a, 31b, game progress sections 32a, 32b, event information transmission sections 33a, 33b, event information reception sections 34a, 34b, frame rate measurement sections 35a, 35b, and display control units 36a, 36b.

The server system 1 acts as an event information transfer section 41 as a result of the CPU (omitted from the drawings) of the game server 14 mainly reading out and executing a server-side game progress program or similar which is stored on a computer-readable recording medium (omitted from the drawings) such as a hard disk.

The operation section 31a is constituted from an input section 25 of the client computer 2a, or similar, and is used by a pitcher-side member to operate a pitcher character, and outputs pitch information inputted by a pitcher-side member to the game progress section 32a and the event information transmission section 33a.

The game progress section 32a is constituted from the CPU 22 of the client computer 2a, or similar, and causes a game to progress in accordance with a pitching action (first progress state) determined by pitch information inputted by the pitcher-side member using the operation section 31*a*, and causes corresponding game screens to be displayed sequentially using the display control unit 36*a*.

Here, a pitching action is, for example, an action in which the pitcher character pitches and is an action until before the batter character bats a ball object, or until before a catcher character (equivalent to a catcher in a real baseball game) catches the ball object, or similar.

The event information transmission section 33*a* is constituted from the communication section 26 of the client computer 2*a*, or the like, and transmits pitch information, which has been inputted by the pitcher-side member using the operation section 31*a*, to the server system 1 via the network 3. The event information transfer section 41 is constituted from the game server 14 or similar, and transfers pitch information, which has been transmitted from the event information transmission section 33*a*, to the client computer 2*b* via the network 3.

The event information reception section 34*b* is constituted from the communication section 26 of the client computer 2*b*, or the like, and receives pitch information transferred by the event information transfer section 41. The game progress section 32*b* is constituted from the CPU 22 of the client computer 2*b*, or the like, and causes a game to progress in accordance with a pitching action (first progress state) determined by pitch information received by the event information reception section 34*b*, and causes corresponding game screens to be displayed sequentially using the display control unit 36*a*.

The operation section 31*b* is constituted from an input section 25 of the client computer 2*b*, or similar, and is used by a batter-side member to operate a batter character, and outputs batting information, which is inputted by a batter-side member while viewing game screens corresponding to a pitching action, to the game progress section 32*b* and the event information transmission section 33*b*.

Further, the game progress section 32*b* causes a game to progress in accordance with a batting action (second progress state) determined by batting information inputted by the batter-side member using the operation section 31*b*, after causing the game to progress in accordance with a pitching action determined by pitch information, and causes corresponding game screens to be displayed sequentially using the display control unit 36*b*.

Here, examples of a batting action include an action until a judgment of a hit or an out is determined after the batter character hits or bunts the ball object and runs for base, or similar, and a fielder character (equivalent to a fielder in a real baseball game) performs a defensive action; an action until a judgment for a strike or a ball is determined after the batter character allows the ball object to pass or misses same and a catcher character catches the ball object; or an action until a judgment of a dead ball is determined after the batter character allows the ball object to pass and the ball object hits the batter character, and the like. In the present embodiment, fielder character defensive actions and the like are performed automatically by the client computers 2*a*, 2*b*.

The event information transmission section 33*b* is constituted from the communication section 26 of the client computer 2*b*, or the like, and transmits batting information, which has been inputted by the batter-side member using the operation section 31*b*, to the server system 1 via the network 3. The event information transfer section 41 transfers batting information, which has been transmitted from the event information transmission section 33*b*, to the client computer 2*a* via the network 3. The event information reception section 34*a* is constituted from the communication section 26 of the client computer 2*a*, or the like, and receives batting information transferred by the event information transfer section 41.

Here, the game progress section 32*a* causes a game to progress such that a pitching action does not end until the event information reception section 34*a* receives batting information, causes a game to progress in accordance with a batting action (second progress state) determined by the received batting information, after the event information reception section 34*a* receives batting information, and causes corresponding game screens to be displayed sequentially using the display control unit 36*a*.

Specifically, the game progress section 32*a* causes a pitching action of the pitcher character to be temporarily suspended such that the batting action of the batter character does not end until the event information reception section 34*a* receives the batting information, causes a game to progress, in accordance with a batting action determined by the received batting information, after the event information reception section 34*a* receives batting information, and causes corresponding game screens to be displayed sequentially using the display control unit 36*a*.

Further, the game progress section 32*a* causes a progress rate of a pitching action of the pitcher character to be lower than a progress rate of a pitching action of the pitcher character by means of the second game progress section 32*b* such that a batting action of the batter character does not begin until the event information reception section 34*a* receives batting information.

The frame rate measurement sections 35*a*, 35*b* are constituted from the CPUs 22 of the client computers 2*a*, 2*b*, or similar, and, when game screens, which correspond to each action after the start of a game that includes the above pitching and batting actions, are displayed, the frame rate measurement sections 35*a*, 35*b* measure the displayable frame rate with respect to the playback rate of game screens to be displayed.

The display control units 36*a*, 36*b* are constituted from the display section 27 of the client computers 2*a*, 2*b*, or similar, and, when game screens, which correspond to each action after the start of a game that includes the above pitching and batting actions, are displayed, the display control units 36*a*, 36*b* display the game screens in accordance with the frame rate measured by the frame rate measurement sections 35*a*, 35*b*.

When there is a reversal between batting and fielding, and a pitcher-side member uses the client computer 2*b* to operate the pitcher character, and the batter-side member uses the client computer 2*a* to operate the batter character, the above components work in the same manner as described hereinabove, in a state where the pitcher side and the batter side have been reversed.

Thus, in the present embodiment, the CPUs 22 of the client computers 2*a*, 2*b*, or similar, correspond to the first and second game progress means, the communication section 26 of the client computer 2*a*, or similar, corresponds to the first event information transmission means and the second event information reception means, the communication section 26 of the client computer 2*b*, or similar, corresponds to the first event information reception means and the second event information transmission means, and the game server 14 or similar corresponds to the event information transfer means. Further, the CPUs 22 of the client computers 2*a*, 2*b*, or similar, correspond to the measurement means, and the display sections 27 of the client computers 2*a*, 2*b*, or similar, correspond to the display control means.

Next, a description will be provided for the operation of the network game system constituted as above. In the description hereinbelow, users have already performed member registration with respect to the member DB server 11, member IDs and passwords for members have been stored in the external storage device 24 of the client computers 2a, 2b used by members, and are stored and managed on the member DB server 11. In addition, the invention is based on the premise that use of the network game is chargeable, and that members have already paid a predetermined fee (which constitutes a billing state) and have network game competition rights.

First, when a client-side game progress program is caused to run as a result of a member using a mouse or the like of the input section 25 of the client computers 2a, 2b, a mode selection screen, which permits members to select a desired mode from among a plurality of modes, is displayed on the display section 27.

Figure 3:
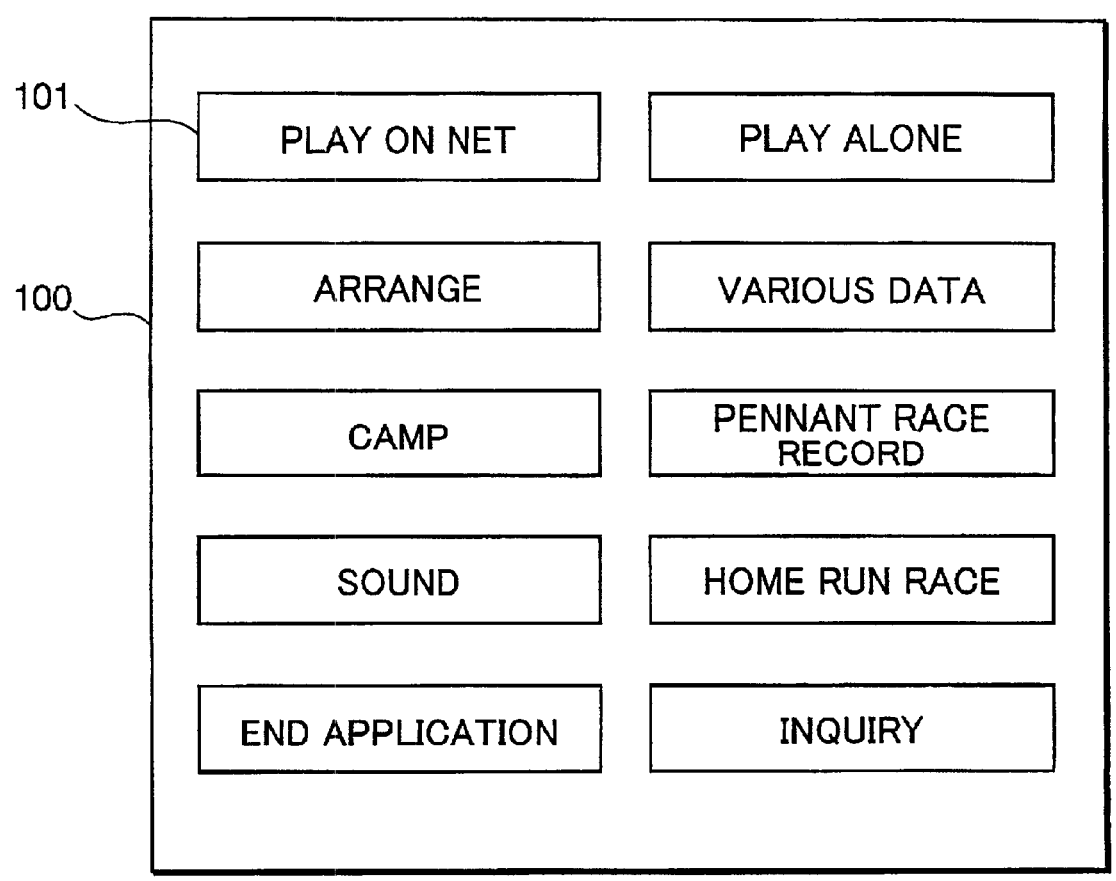
FIG. 3 shows an example of a mode selection screen.

FIG. 3 shows an example of a mode selection screen. For example, when the mode selection screen 100 shown in FIG. 3 is displayed, and a member selects the "Play on Net" button 101 using the mouse, a submenu screen, which permits a member to select a net game from among a plurality of submenus, is displayed on the display section 27.

Figure 4:
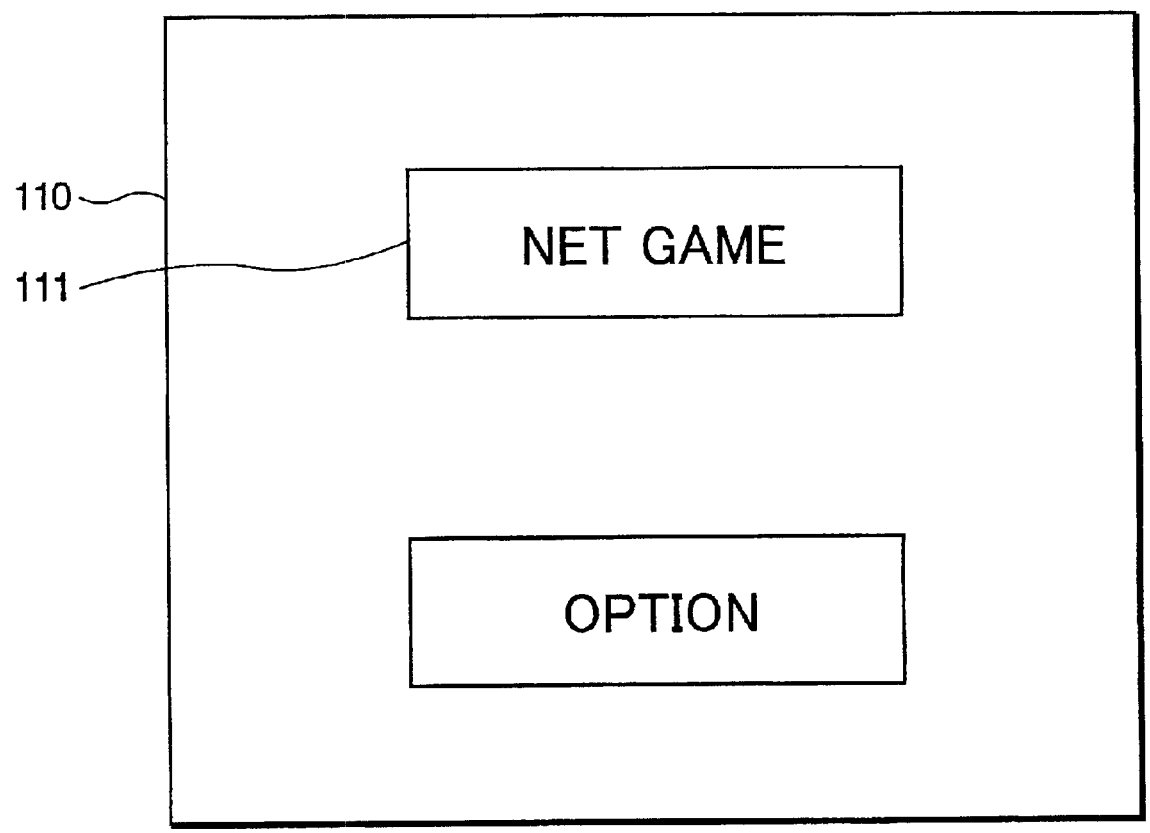
FIG. 4 shows an example of a submenu screen.

FIG. 4 shows an example of a submenu screen. For example, when the submenu screen 110 shown in FIG. 4 is displayed, and a member selects the "Net Game" button 111 using the mouse or the like, a profile information input screen, which permits a member to input profile information, is displayed on the display section 27.

Figure 5:
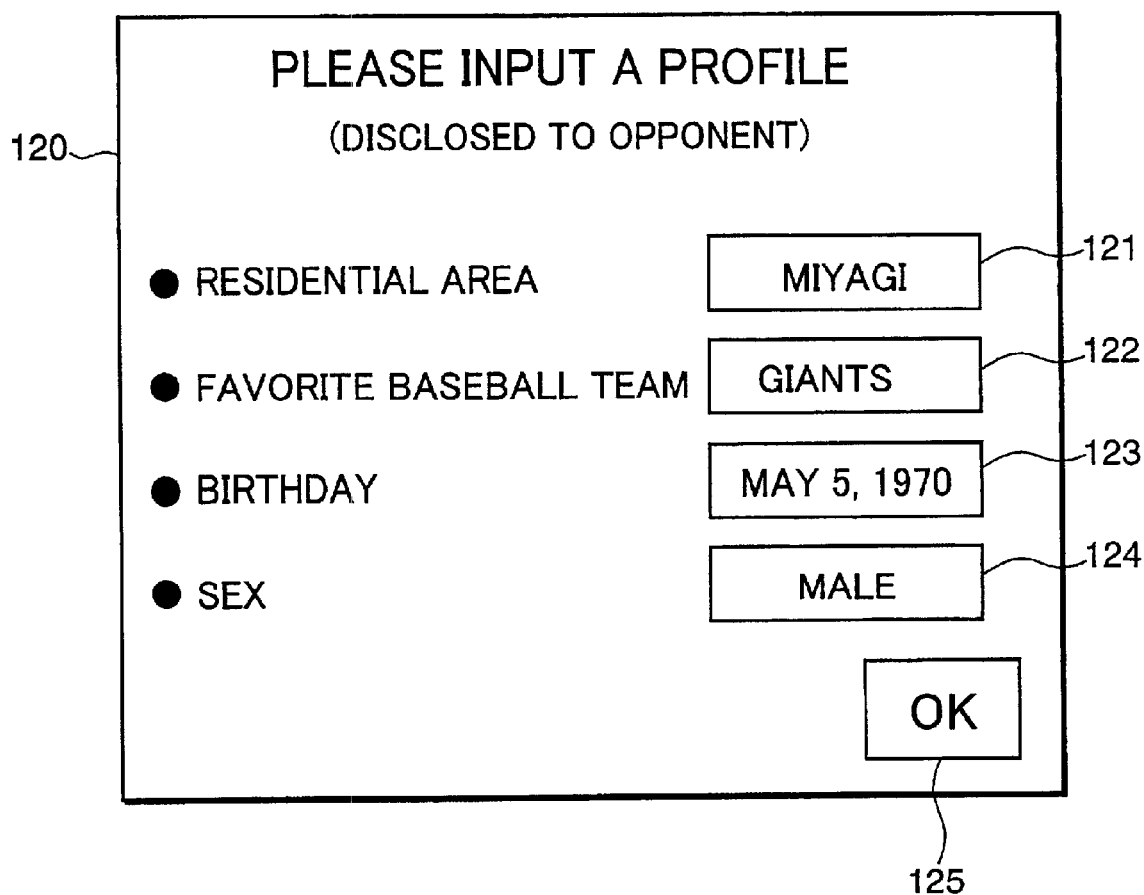
FIG. 5 shows an example of a profile information input screen.

FIG. 5 shows an example of a profile information input screen. For example, when the profile information input screen 120 shown in FIG. 5 is displayed, and a member inputs information into the input fields 121 to 124 which are for residential area, preferred baseball team, date, and sex, and then selects the "OK" button 125, the CPU 22 stores the inputted information on residential area, preferred baseball team, date, and sex in the RAM 21 or the external storage device 24 as profile information.

The communication line used by a member is selected from among CATV (Cable television), ADSL (Asymmetric Digital Subscriber Line), ISDN (Integrated Services Digital Network), and a modem (56 kbps or less), and the like, for example, and the selected communication line may also be inputted as the above profile information. In such a case, each member can select opponents using the same communication line as his or her own communication line by viewing the communication lines which members constituting opponents are using, whereby members with equal communication line rates can play a game.

After profile information has been inputted as above, a team selection screen, which is used by members in a net game or the like, is displayed on the display section 27, and the CPU 22 stores team names which members have selected in the RAM 21 or the external storage device 24.

Next, a confirmation screen for rule settings and game settings, or similar, which are used in a net game or the like, is displayed on the display section 27, and members confirm the rule settings and the like. Here, examples of rule settings include the number of innings per game, if a game can be extended or called, and if the DH rule is in place, or the like, and examples of game settings include a wind state, a weather state, a game time zone, an error generation state, a player condition state, and whether or not a player is injured, or the like.

After processing for the above rule settings and the like has finished, the client computers 2a, 2b access the lobby server 13 via the network 3, and the CPU 22 uses the communication section 26 to transmit a member ID and password stored in the external storage device 24 to the lobby server 13, and to transmit profile information, or other information, stored in the RAM 21 or the external storage device 24 to the lobby server 13.

Here, the lobby server 13 receives the transmitted member ID and password, or similar, and an enquiry is sent to the member DB server 11 of whether the member to whom the received member ID and password is allocated has competition rights. The member DB server 11 checks the billing state of a member which is predetermined from the member ID and password, and notifies the lobby server 13 of the result of whether or not this member has competition rights.

In such a case, because the member has competition rights, the member DB server 11 notifies the lobby server 13 that the member has competition rights, and the lobby server 13 stores received profile information or similar, for each member, on a RAM or the like, and stores, for each member, each item of information such as a team name, on the game DB server 16.

Therefore, in the present embodiment, after all setting processing has finished, all types of information such as profile information and team names are sent together to the server system 1, meaning that the connection time for the server system 1 and the client computers 2a, 2b can be shortened, and unnecessary charges are not made.

Next, the lobby server 13 transmits data, which is for displaying the competition lobby selection screen which permits the selection of a desired competition lobby, to the client computers 2a, 2b.

Figure 6:
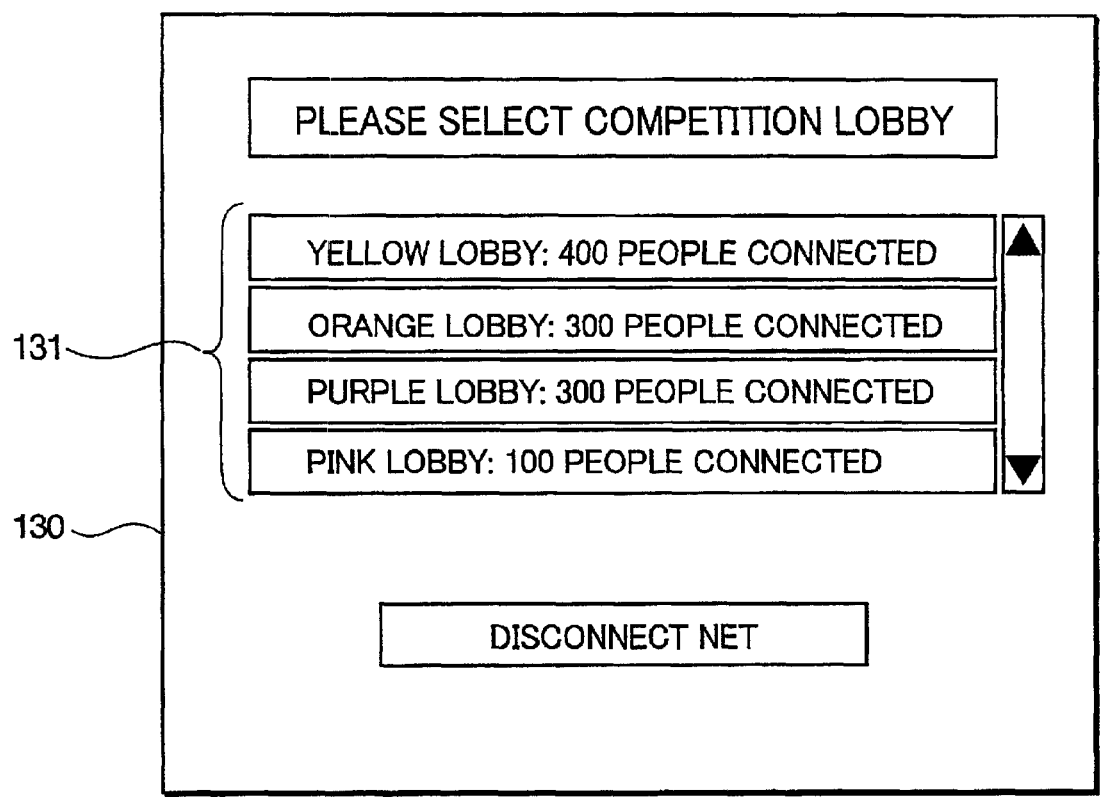
FIG. 6 shows an example of a competition lobby selection screen.

FIG. 6 shows an example of a competition lobby selection screen. The client computers 2a, 2b use received data to display the competition lobby selection screen 130 shown in FIG. 6 on the display section 27, and a plurality of competition lobby selection buttons 131 are displayed.

When a competition lobby name is displayed on each of the competition lobby selection buttons 131, the number of members in each of the competition lobbies is displayed. At such time, when a member uses a mouse or similar to select a desired competition lobby selection button from the plurality of competition lobby selection buttons 131, the lobby server 13 transmits data, which is for displaying a competition area selection screen which permits the selection of a desired competition area from a plurality of competition areas, to the client computers 2a, 2b.

Figure 7:
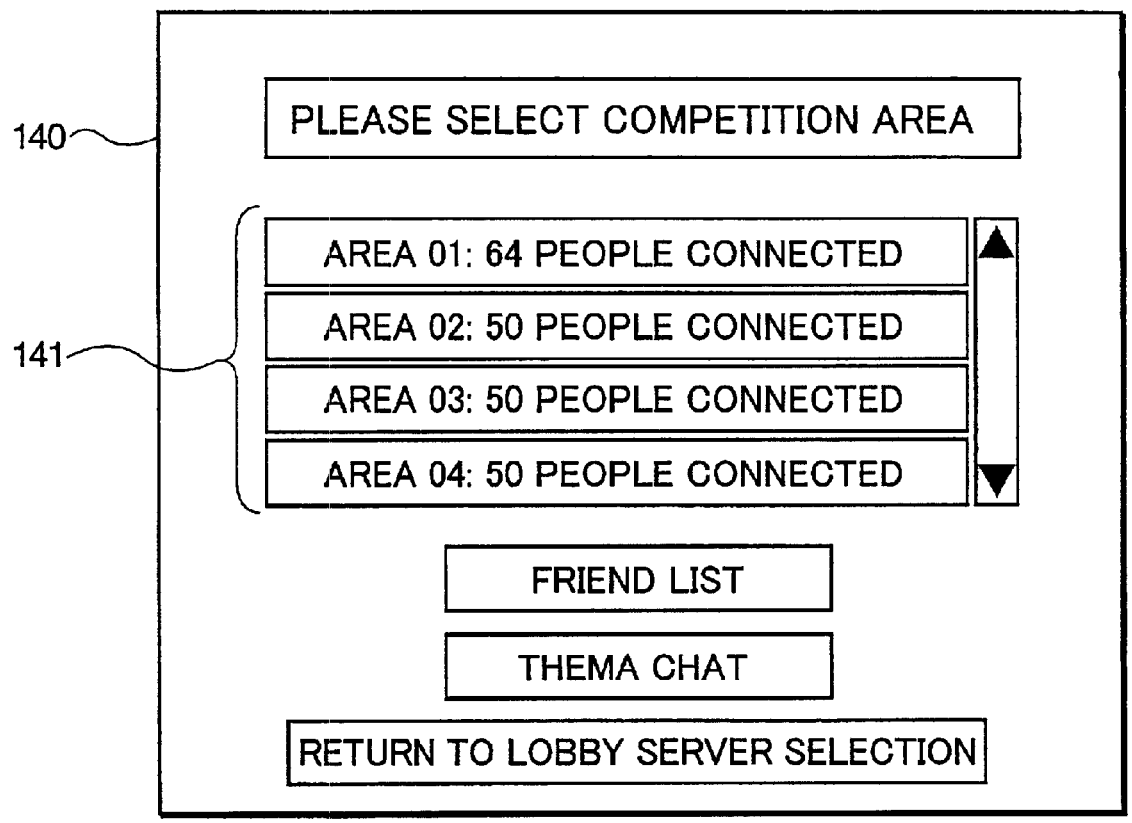
FIG. 7 shows an example of a competition area selection screen.

FIG. 7 shows an example of a competition area selection screen. The client computers 2a, 2b use received data to display the competition area selection screen 140 shown in FIG. 7 on the display section 27, and a plurality of competition area selection buttons 141 are displayed.

When a competition area name is displayed on each of the competition area selection buttons 141, the number of members in each of the competition areas is displayed. At such time, when a member uses a mouse or similar to select a desired competition area selection button from the plurality of competition area selection buttons 141, the CPU 22 of the client computers 2a, 2b displays a competition mode selection screen for selecting a competition mode on the display section 27.

Figure 8:
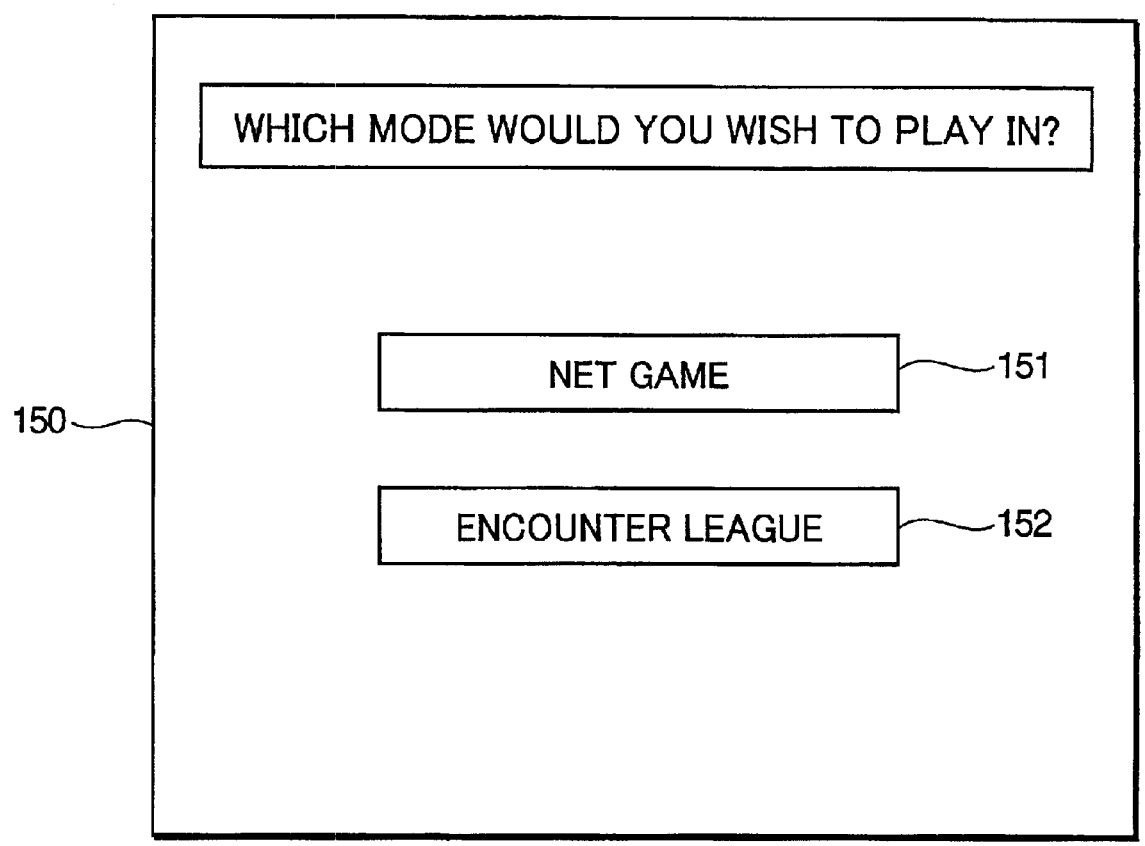
FIG. 8 shows an example of a competition mode selection screen.

FIG. 8 shows an example of a competition mode selection screen. For example, when the competition mode selection screen 150 shown in FIG. 8 is displayed, and a member uses a mouse or similar to select the "Net Game" button 151, the lobby server 13 transmits data, which is for displaying a net game lobby top screen, or similar, to the client computers 2a, 2b.

Figure 9:
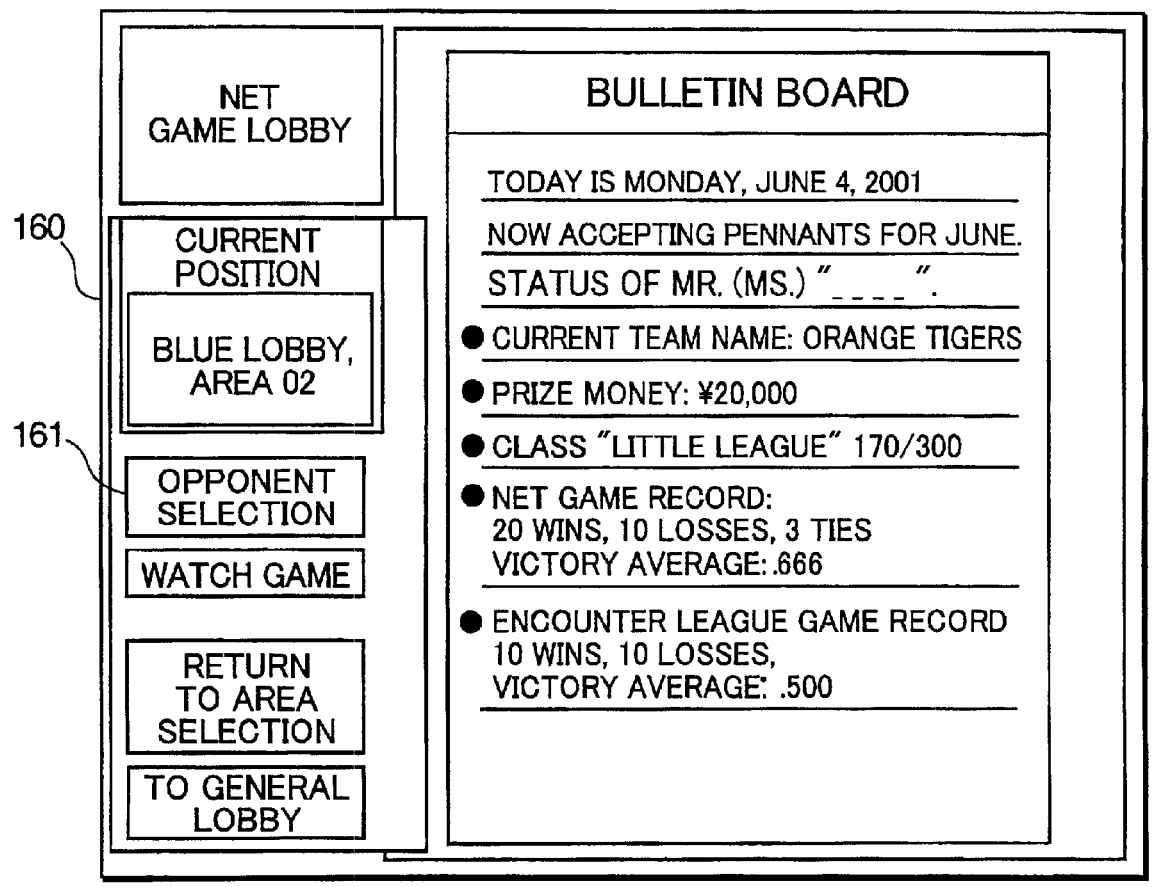
FIG. 9 shows an example of a network competition lobby top screen.

FIG. 9 shows an example of a network competition lobby top screen. The client computers 2a, 2b use the received data or the like to display the net game lobby top screen 160 shown in FIG. 9, for example, on the display section 27. At such time, when a member uses a mouse or similar of the input section 25 of the client computer 2a to select the "Opponent Selection" button 161, as a result of predetermined processing, the member using the client computer 2b is determined as the opponent, and a baseball game begins in accordance with a normal competition.

Furthermore, also when a member uses a mouse or similar to select the "Encounter League" button 152 shown in FIG. 8, an opponent is determined by predetermined processing, and a baseball game begins in accordance with an encounter league.

Next, a description will be provided of network game progress control processing for causing an action in which a batter character bats a ball object pitched by a pitcher character in the above normal competition and encounter league.

Figure 10:
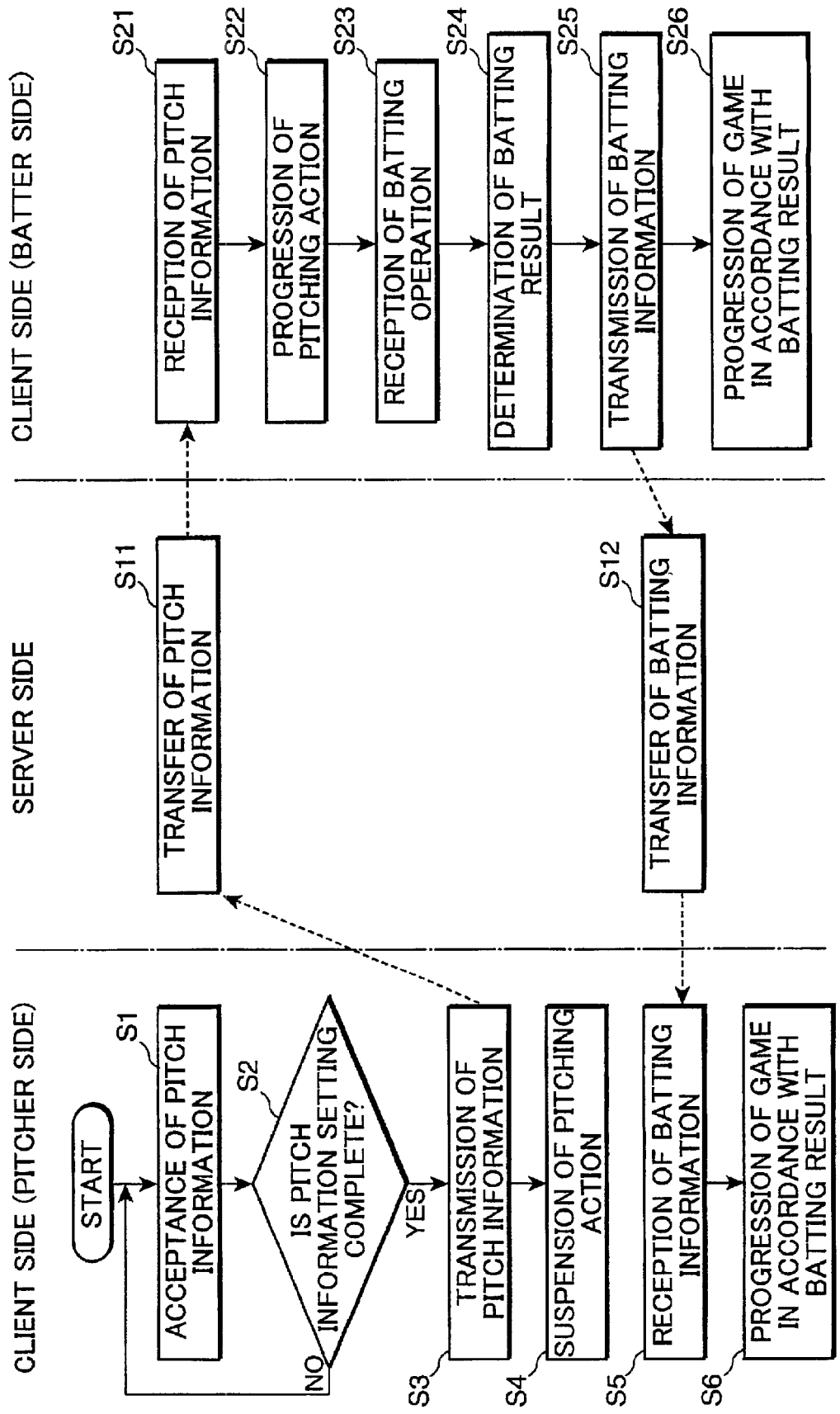
FIG. 10 is a flowchart showing an example of network game progress control processing by means of the server system and client computers shown in FIG. 1.

FIG. 10 is a flowchart showing an example of network game progress control processing by means of the server system 1 and client computers 2a, 2b shown in FIG. 1. Network game progress control processing of the client computers 2a, 2b shown in FIG. 10 is processing which is performed as a result of the CPU 22 executing a client-side game progress program or the like, and network game progress control processing of the server system 1 is processing which is performed as a result of the game server 14 or similar executing a server-side game progress program or the like.

As shown in FIG. 10, first, in step S1, the CPU 22 of the pitcher-side client computer 2a causes a pitch information setting screen, which is for setting ball-type information and course information, to be displayed on the display section 27, in order to allow the pitcher-side member to perform a pitching action using the pitcher character, and accepts ball-type information and course information, which are inputted by the pitcher-side member using the mouse or similar of the input section 25, as pitch information.

Figure 11:
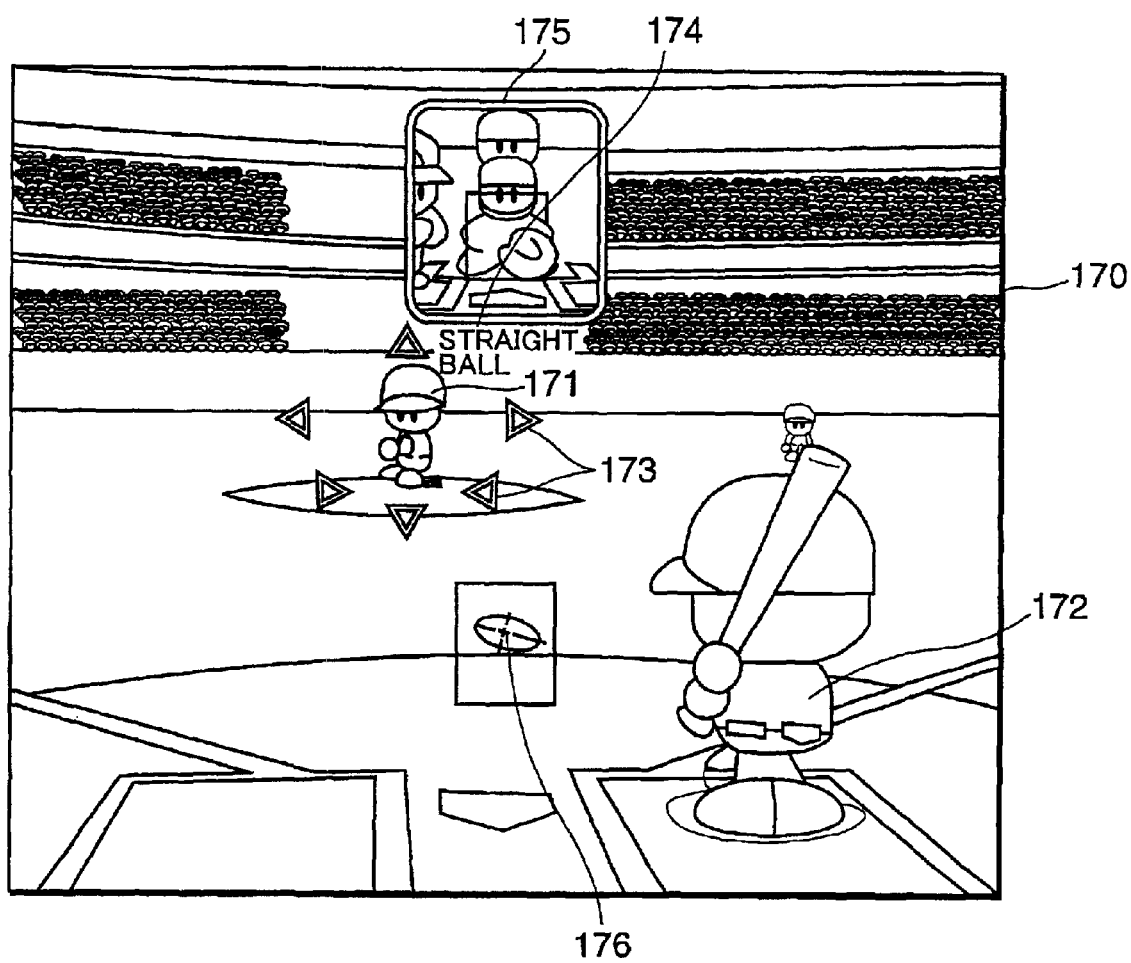
FIG. 11 shows an example of the pitch information setting screen.

FIG. 11 shows an example of the pitch information setting screen. When ball-type information and course information is inputted by the pitcher-side member, the pitch information setting screen 170 shown in FIG. 11 is displayed. A pitcher character 171 is displayed substantially in the center of the pitch information setting screen 170, and a batter character 172 is displayed on a batter box. Course selection arrows 173, which are used to determine the course of a ball object pitched by the pitcher character 171, are displayed around the pitcher character 171, and ball-type information 174, which indicates the ball-type of the ball object pitched by the pitcher character 171, is displayed.

Further, a small screen 175, in which the batter character 172 is seen from the perspective of the pitcher character 171, is displayed in a central upper section of the screen, and a meet cursor 176, which is for determining a batting point using the batter character 172, is displayed in a central lower section of the screen. Since the pitcher-side member cannot operate the batter character 172, the meet cursor 176 of the pitcher-side pitch information setting screen is inoperable.

At such time, when the pitcher-side member uses the mouse to click on the ball-type information 174, straight ball, curveball, and other ball types, are displayed sequentially, and the ball type which is currently displayed is accepted as ball-type information; in the example of FIG. 11, the ball type is set as a straight ball. Also, when the pitcher-side member uses the mouse to select one course selection arrow from among the course selection arrows 173 of six directions, the course determined by the selected course selection arrow 173 is accepted as course information.

Figure 12:
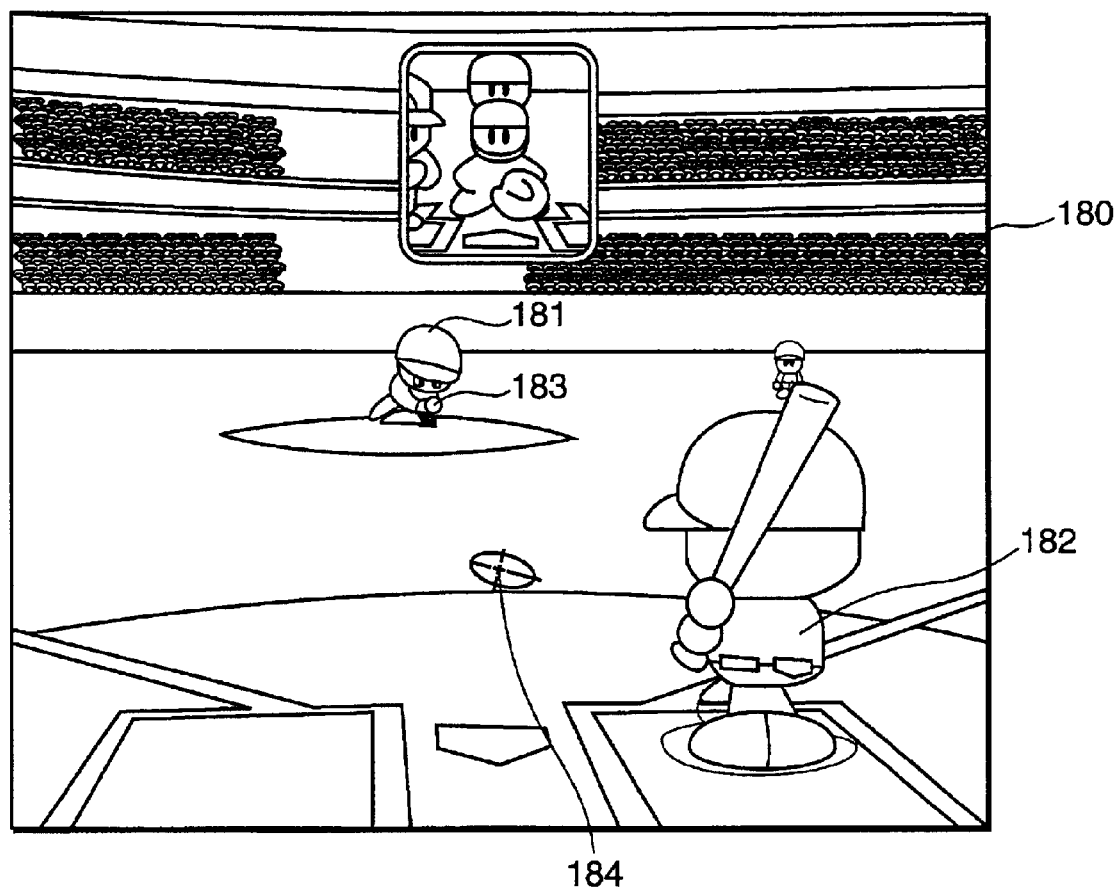
FIG. 12 shows an example of a pitching start screen.
Figure 13:
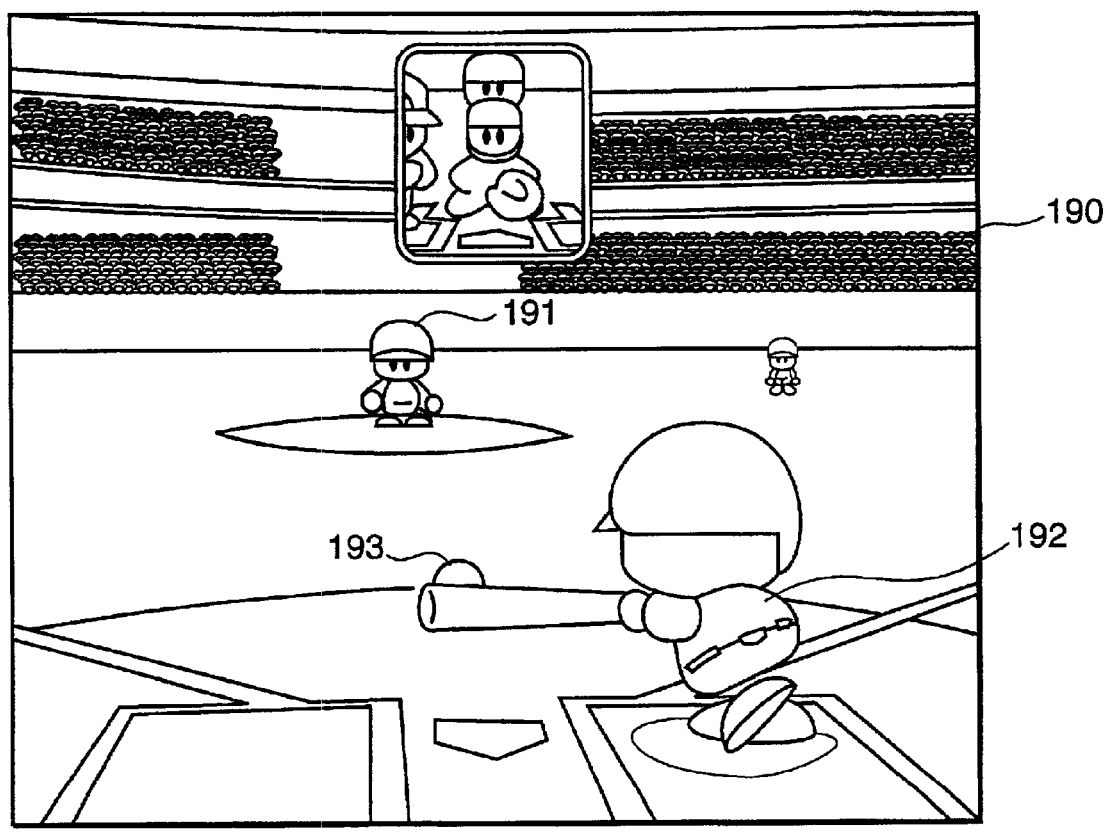
FIG. 13 shows an example of a batting operation screen.

In order to simplify the illustration, only the principal elements are shown in FIG. 11, but the name of the pitcher character 171, the defense rate thereof, or similar, may be displayed to the right of the pitcher character 171, the name of the batter character 172, the batting rate thereof, or similar, may be displayed in a lower section on the left side of the screen, and, on the center left-hand side of the screen, the current game score status, the strike count, the ball count, the out count, and the like, may be displayed. FIGS. 12 and 13 (described hereinafter) are also similar in this respect.

Next, in step S2, the CPU 22 of the pitcher-side client computer 2a judges whether or not the setting of the ball-type information and course information has finished, and when the setting of the ball-type information and course information has not finished, the CPU 22 repeats step S1, and when the setting of the ball-type information and course information has finished, the CPU 22 proceeds to step S3.

Next, in step S3, the CPU 22 of the pitcher-side client computer 2a stores the set ball-type information and course information in the RAM 23, and the communication section 26 transmits the set ball-type information and course information via the network 3 to the server system 1.

Next, in step S4, the CPU 22 of the pitcher-side client computer 2a causes the pitcher character pitching action to be temporarily suspended after causing same to begin, and displays a corresponding game screen on the display section 27. A variety of times can be used for the time at which the pitcher character pitching action is suspended. For example, temporary suspension is possible at such times as the instant the pitcher character raises his arm to pitch, the instant of adopting the set position, and the like.

In this case, the pitching action of the pitcher character is temporarily suspended such that a batting action of the batter character does not begin until batting information for determining a batting result of the batter character is received, meaning that, even if there is a variation of any kind between the transfer times of the pitch information and batting information, in the pitcher-side and batter-side client computers 2a, 2b, it is possible to cause a batting action of the batter character to progress smoothly after a pitching action of the pitcher character has been caused to progress.

Meanwhile, in step S11, the game server 14 uses the lobby server 13 to transfer ball-type information and course information, which have been transmitted from the client computer 2a, to the client computer 2b via the network 3.

At such time, in step S21, the communication section 26 of the batter-side client computer 2b receives the ball-type information and course information transferred by the game server 14, and outputs the received ball-type information and course information to the CPU 22.

Next, in step S22, the CPU 22 of the batter-side client computer 2b causes the game to progress in accordance with the pitching action determined by the ball-type information and course information transferred from the communication section 26, and sequentially displays corresponding game screens on the display section 27; for example, the CPU 22 causes a pitching start screen, which indicates a pitcher character pitching start action, to be displayed on the display section 27.

FIG. 12 shows an example of a pitching start screen. The pitcher character starts a pitching action in accordance with a pitching action determined by ball-type information and course information, and the pitching start screen 180 shown in FIG. 11 is displayed. A pitcher character 181 that is pitching a ball object 183 is displayed substantially in the center of the pitching start screen 180, and a batter character 182 is displayed on a batter box. Also, a meet cursor 184, which is for determining a batting point using the batter character 182, is displayed in a central lower section of the screen.

Next, in step S23, the CPU 22 of the batter-side client computer 2b accepts a batting operation in which the batter-side member uses the mouse of the input section 25 to manipulate a meet cursor 184 so that the batting point coincides with a pitched ball object, and sequentially displays game screens in accordance with this operation on the display section 27.

Next, in step S24, the CPU 22 of the batter-side client computer 2b determines a batting result which is generated as the result of the above batting operation.

FIG. 13 shows an example of a batting operation screen. When the batter character performs hitting as a result of the batter-side member operating the batter character, the batting operation screen 190 shown in FIG. 13 is displayed, for example. A pitcher character 191 for after the pitch is displayed substantially in the center of the batting operation screen 190, and a batter character 192 that is batting a ball object 193 is displayed.

In the case described above, the CPU 22 of the batter-side client computer 2b determines a judgment of a hit or an out as the batting result. Further, to cite other cases, for example, when the batter character allows the ball object to pass, a judgment for a ball, a strike or a dead ball, is determined, and, when the batter character misses, a judgment for a strike is determined.

Next, in step S25, the communication section 26 of the batter-side client computer 2b transmits batting information corresponding to the determined batting result to the server system 1 via the network 3.

Next, in step S26, the CPU 22 of the batter-side client computer 2b causes the game to progress in accordance with a batting action determined by batting information corresponding to the determined batting result, and causes corresponding game screens to be sequentially displayed on the display section 27.

Meanwhile, in step S12, the game server 14 uses the lobby server 13 to transfer batting information, which has been transmitted from the client computer 2b, to the client computer 2a via the network 3.

At such time, in step S5, the communication section 26 of the pitcher-side client computer 2a receives batting information which has been transferred by the game server 14, and outputs the received batting information to the CPU 22.

Next, in step S6, the CPU 22 of the pitcher-side client computer 2a causes the game to progress in accordance with a batting action determined by the batting information transferred from the communication section 26, after the temporarily suspended pitching action of the pitcher character has been restarted. At such time, a batting operation screen, in which the batter character is performing hitting and which is similar to the batting operation screen shown in FIG. 13, is displayed, and, thereafter, the game is caused to progress similarly to the batter-side client computer 2b, and corresponding game screens are displayed sequentially on the display section 27.

As described above, in the present embodiment, in the pitcher-side client computer 2a, a baseball game is caused to progress in accordance with a pitching action determined by pitch information, pitch information is transmitted from the client computer 2a to the server system 1, and transmitted pitch information is transferred from the server system 1 to the batter-side client computer 2b.

At such time, in the batter-side client computer 2b, pitch information, which has been transferred from the server system 1, is received, and, after the baseball game has been caused to progress in accordance with a pitching action determined by the received pitch information, the baseball game is caused to progress in accordance with a batting action determined by batting information for determining the next progress state, batting information is transmitted to the server system 1, and the transmitted batting information is transferred from the server system 1 to the pitcher-side client computer 2a.

Meanwhile, in the pitcher-side client computer 2a, the baseball game is caused to progress such that the pitching action does not end until the batting information is received, and the game is caused to progress in accordance with a batting action determined by the batting information, after the batting information is received.

Therefore, the pitcher-side client computer 2a causes the baseball game to progress such that the pitching action does not end until the batting information is received, and causes the baseball game to progress in accordance with a batting action determined by the batting information, after the batting information is received, and consequently, even if there is a variation between the time for the transfer of pitch information from the pitcher-side client computer 2a to the batter-side client computer 2b and the time for the transfer of batting information from the batter-side client computer 2b to the pitcher-side client computer 2a, which is caused by a difference in capacity such as the processing speed of the pitcher-side and batter-side client computers 2a, 2b, and/or by a disparity in the data transfer rates of the communication lines thereof, in the pitcher-side and batter-side client computers 2a, 2b, after the game is caused to progress in accordance with a pitching action determined by pitch information, the baseball game is caused to progress smoothly in accordance with a batting action determined by batting information.

As a result, it is possible to cause a baseball game which uses a network and is between a pitcher-side member and a batter-side member to progress smoothly without being subject to effects caused by a disparity in the data transfer rates of the pitcher-side and batter-side client computers 2a, 2b and/or by a difference in the hardware capacity thereof.

Further, as a result of the above processing, it is possible to cause a baseball game which uses a network to progress smoothly without being subject to effects caused by a disparity in the data transfer rates of communication lines, meaning that, instead of using a costly synchronous communication system employing a dedicated line and the like, a network game can be played using a network of a low-cost asynchronous communication system such as the Internet.

Further, in the processing above, in step S4, a pitching action of the pitcher character is temporarily suspended, but the CPU 22 of the pitcher-side client computer 2a may also perform slow playback by causing the progress rate of the pitching action of the pitcher character to be lower than the progress rate of the pitching action of the pitcher character by means of the CPU 22 of the batter-side client computer 2b, such that a batting action of the batter character does not begin until the communication section 26 of the pitcher-side client computer 2a receives batting information.

Here, the member using the pitcher-side client computer 2a is able to see a state in which the pitching action of the pitcher character changes sequentially, and, consequently, it is possible to cause a baseball game, which is between members via a network 3 and in which a batter character bats a ball object pitched by a pitcher character, to progress smoothly, without causing this member visual discomfort.

Figure 14:
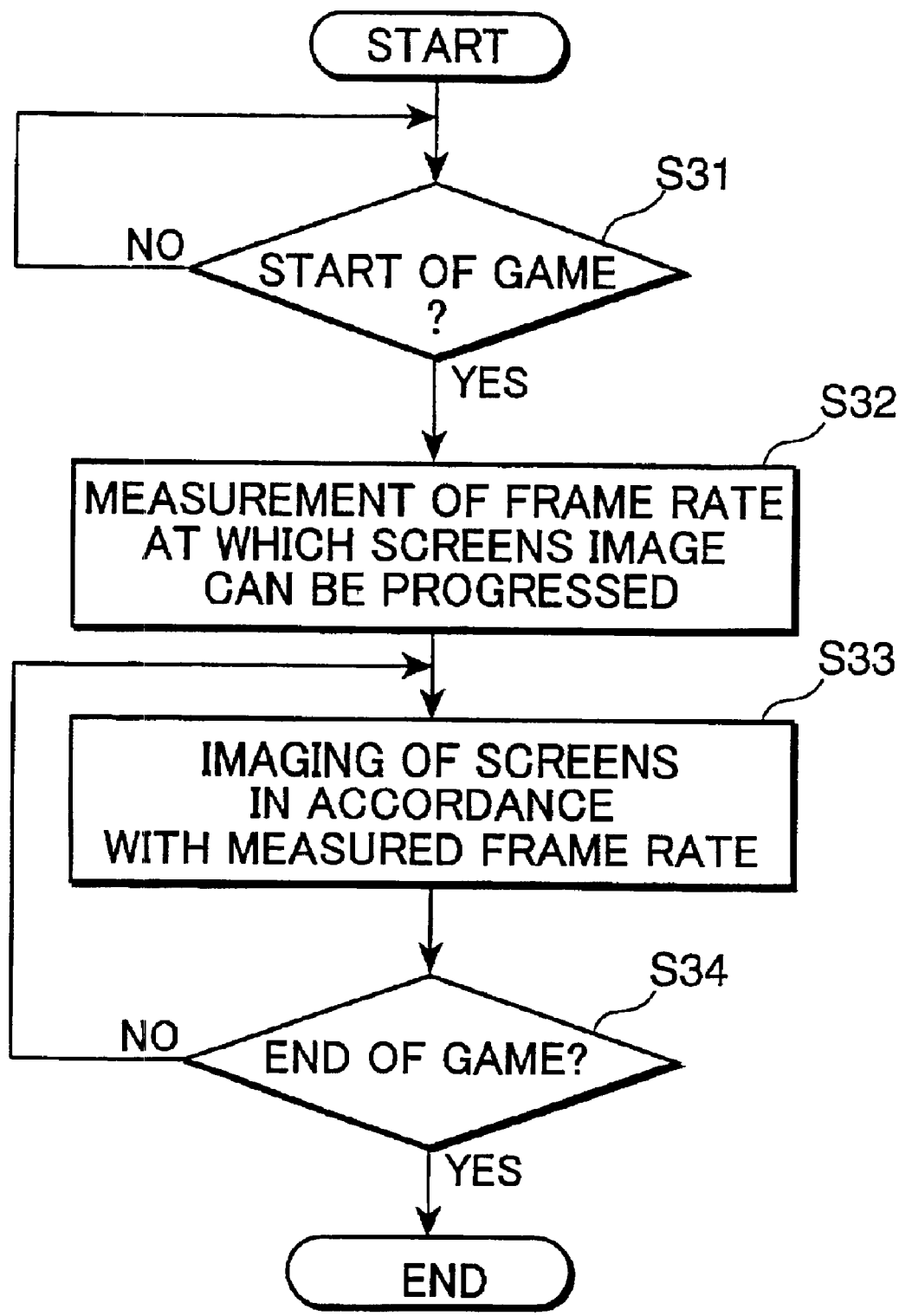
FIG. 14 is a flowchart showing an example of frame rate control processing by means of the client computers shown in FIG. 1.

Next, a description will be provided of frame rate control processing to control the frame rate of game screens displayed. FIG. 14 is a flowchart showing an example of frame rate control processing by means of the client computers 2a, 2b shown in FIG. 1. The frame rate control processing shown in FIG. 14 is processing which is performed as a result of the CPU 22 of the client computers 2a, 2b executing a frame rate control program or the like.

As shown in FIG. 14, first, in step S31, the CPU 22 of the client computers 2a, 2b judges whether or not a game of a baseball game in a normal competition and an encounter league has started, and when the game has not started, the CPU 22 repeats step S31, and when the game has started, the CPU 22 proceeds to step S32.

When the game has started, in step S32, when game screens, which correspond to each action after the start of a game that includes the above pitching and batting actions, are displayed on the display section 27, the CPUs 22 of the client computers 2a, 2b measure the displayable frame rate, with respect to the playback rate of game screens to be displayed, in units of one frame. For example, the CPUs 22 usually measure imaging frames automatically, sequentially judge whether imaging, in units of one frame, of 54 frames per second is possible, imaging of 53 frames per second is possible, imaging of 52 frames per second is possible, and so forth, whereby it is possible to measure a displayable frame rate, in units of one frame, by determining the imaging frame rate that can be rendered.

The method for measuring the displayable frame rate is not limited to that described above in particular, it being possible to employ a variety of methods, for example, a method is also possible in which the result of a benchmark test, which is performed with respect to the imaging capacity and the like of the CPUs 22 of the client computers 2a, 2b, is acquired in advance and displayable frame rates are measured in units of one frame by comparing this benchmark test result and image data which is imaged.

Next, in step S33, the CPUs 22 of the client computers 2a, 2b control the display sections 27 such that same display the game screens at the measured frame rates, and the game screens are displayed in accordance with the measured frame rates.

Next, in step S34, the CPUs 22 of the client computers 2a, 2b judge whether or not a game of a baseball game in a normal competition and an encounter league has ended, and when the game has not ended, the CPUs 22 proceed to step S34 and repeat subsequent processing, and when the game has ended, the CPUs 22 end the processing.

According to the processing above, in the present embodiment, in the client computers 2a, 2b, the displayable frame rate, with respect to the playback rate of game screens to be displayed, is measured, and the game screens are displayed in accordance with the measured frame rate, and, consequently, even when there is a difference in hardware capacity between the client computers 2a, 2b, it is possible to display game screens at a fixed playback rate, whereby it is possible to cause a network game to progress smoothly without being subject to effects caused by a difference in hardware capacity.

In the present embodiment, a pitching action of the pitcher character is temporarily suspended and so forth such that a batting action of the batter character does not begin until the communication section 26 of the pitcher-side client computer 2a receives batting information, but processing is not limited to this example in particular and may be such that a batting action of the batter character does not begin until batting information is received by another method, it being equally possible, for example, to combine, with optimum timing, the above suspension action and slow playback, or to perform slow playback of the initial movement of a ball object pitched by the pitcher character.

Further, in the present embodiment, personal computers are used as terminal devices, but other terminal devices may also be employed such as cellular telephones or mobile information terminals, as long as same permit network games to be played.

Further, transmission and so forth is equally possible by encrypting each item of information or similar, which is transmitted and received between the server system 1 and the client computers 2a, 2b, by means of a publicly known encryption technology or the like. In such a case, the security of each item of information transmitted can be improved.

Further, in the above description, the description was with regard to a case where members, who have paid a predetermined fee, play a network game. However, the present invention is similarly applicable and the same results can be obtained in a case where unspecified users can pay a fee by using a pre-paid card or similar, or in a case where a network game is played free of charge, and so forth.

In summary, the present invention relates to a network game progress control system, which causes a network game played in a game space by users to progress, comprising: a first terminal device, which is used by a first user; a second terminal device, which is used by a second user different from the first user; and a network game server device, which is communicably connected via a network with the first and second terminal devices, and which controls progress of a game played in a game space by the first and second users using the first and second terminal devices, wherein the first terminal device comprises first game progress means that causes a game to progress in accordance with a first progress state determined by first event information for determining a game progress state; and first event information transmission means which transmits the first event information to the network game server device; the network game server device comprises event information transfer means which transfers first event information, which is transmitted by the first event information transmission means, to the second terminal device; the second terminal device comprises first event information reception means which receives first event information transferred by the event information transfer means; second game progress means which causes a game to progress in accordance with a second progress state determined by second event information for determining the next game progress state after the game has been caused to progress in accordance with the first progress state determined by the first event information received by the first event information reception means; and second event information transmission means which transmits the second event information to the network game server device; the event information transfer means transfers second event information, which is transmitted by the second event information transmission means, to the first terminal device; the first terminal device further comprises second event information reception means which receives second event information transferred by the event information transfer means;

and the first game progress means causes a game to progress such that the first progress state does not end until the second event information reception means receives the second event information, and causes a game to progress in accordance with the second progress state after the second event information reception means receives the second event information.

According to the present invention as described in the above, the network game progress control system, which controls progress of a network game played in a game space by users, comprises a first terminal device, which is used by a first user; a second terminal device, which is used by a second user different from the first user; and a network game server device, which is communicably connected via a network with the first and second terminal devices, and which controls the progress of a game played in a game space by the first and second users using the first and second terminal devices.

The first terminal device comprises first game progress means that causes a game to progress in accordance with a first progress state determined by first event information for determining a game progress state; and first event information transmission means which transmits the first event information to the network game server device. The network game server device comprises event information transfer means which transfers first event information, which is transmitted by the first event information transmission means, to the second terminal device. The second terminal device comprises first event information reception means which receives first event information transferred by the event information transfer means; second game progress means which causes a game to progress in accordance with a second progress state determined by second event information for determining the next game progress state after the game has been caused to progress in accordance with the first progress state determined by the first event information received by the first event information reception means; and second event information transmission means which transmits the second event information to the network game server device.

The event information transfer means comprised by the network game server device transfers second event information, which is transmitted by the second event information transmission means, to the first terminal device. The first terminal device further comprises second event information reception means which receives second event information transferred by the event information transfer means, and the first game progress means causes a game to progress such that the first progress state does not end until the second event information reception means receives the second event information, and causes a game to progress in accordance with the second progress state, which is determined by second event information, after the second event information reception means receives the second event information.

In other words, in the first terminal device, the game is caused to progress in accordance with a first progress state determined by first event information for determining a game progress state, first event information is transmitted from the first terminal device to the network game server device, and the first event information thus transmitted is transferred from the network game server device to the second terminal device.

At this time, in the second terminal device, first event information, which is transferred from the network game server device, is received; the game is caused to progress in accordance with a second progress state determined by second event information for determining the next game progress state, after the game has been caused to progress in accordance with the first progress state determined by the received first event information; second event information is transmitted to the network game server device; and transmitted second event information is transferred from the network game server device to the first terminal device.

Meanwhile, in the first terminal device, the game is caused to progress such that the first progress state does not end until the second event information is received, and the game is caused to progress in accordance with the second progress state determined by the second event information after the second event information is received.

Therefore, in the first terminal device, the game is caused to progress such that the first progress state does not end until the second event information is received, and the game is caused to progress in accordance with the second progress state determined by the second event information after the second event information is received, and, consequently, even if there is a variation between the time for the transfer of first event information from the first terminal device to the second terminal device and the time for the transfer of second event information from the second terminal device to the first terminal device, which is caused by a difference in capacity between the first and second terminal devices and/or by a disparity in the data transfer rates of the communication lines used by the first and second terminal devices, in the first and second terminal devices, after the game is caused to progress in accordance with the first progress state, the game is caused to progress in accordance with the second progress state. According to the present invention as defined, even if there is a variation in the transfer times of the first and second event information for determining the game progress states, in the first and second terminal devices, after the game is caused to progress in accordance with the first progress state, the game is caused to progress in accordance with the second progress state, meaning that it is possible to cause a network game between users to progress smoothly without being subject to effects caused by a data transfer rate disparity and/or a difference in hardware capacity.

In the above described invention, the first game progress means may be set to cause the first progress state to be temporarily suspended such that the first progress state does not end until the second event information reception means receives the second event information.

With the above features, the first game progress means causes the first progress state to be temporarily suspended such that the first progress state does not end until the second event information reception means receives the second event information for determining the second progress state.

In other words, the first progress state is temporarily suspended such that the first progress state does not end until the second event information for determining the second progress state is received, meaning that, even if there is a variation of any kind between the transfer times of the first and second event information for determining the game progress states, in the first and second terminal devices, after the game is caused to progress in accordance with the first progress state, the game is caused to progress in accordance with the second progress state, meaning that it is possible to cause a network game between users to always progress smoothly without being subject to effects caused by a data transfer rate disparity and/or a difference in hardware capacity.

The above described invention may have the following features in that network game includes a baseball game in which a batter character bats a ball object pitched by a pitcher character in a game space; the first user uses the first terminal device to operate the pitcher character; the second user uses the second terminal device to operate the batter character; the first event information comprises pitch information for determining the movement of the ball object pitched by the pitcher character; the second event information comprises batting information for determining a batting result of the batter character; and the first game progress means causes a pitching action of the pitcher character to be temporarily suspended such that a batting action of the batter character does not begin until the second event information reception means receives the batting information.

With the above features, the network game includes a baseball game in which a batter character bats a ball object pitched by a pitcher character in a game space; the first user uses the first terminal device to operate the pitcher character; the second user uses the second terminal device to operate the batter character; the first event information comprises pitch information for determining the movement of the ball object pitched by the pitcher character; the second event information comprises batting information for determining a batting result of the batter character; and the first game progress means causes a pitching action of the pitcher character to be temporarily suspended such that a batting action of the batter character does not begin until the second event information reception means receives the batting information.

In other words, the pitching action of the pitcher character is temporarily suspended such that a batting action of the batter character does not begin until batting information for determining a batting result of the batter character is received, meaning that, even if there is a variation of any kind between the transfer times of the pitch information and batting information for determining a pitching action of the pitcher character and a batting action of the batter character respectively, in the first and second terminal devices, it is possible to cause a batting action of the batter character to progress after a pitching action of the pitcher character has been caused to progress. In other words, it is possible to cause a baseball game, which is played between users via a network and in which a batter character bats a ball object pitched by a pitcher character, to always progress smoothly without being subject to effects caused by a data transfer rate disparity and/or a difference in hardware capacity.

In addition, the present invention may have the following features that the first game progress means causes a progress rate of the first progress state to be lower than a progress rate of the first progress state by means of the second game progress means such that the first progress state does not end until the second event information reception means receives the second event information.

With the above features, the first game progress means causes a progress rate of the first progress state to be lower than a progress rate of the first progress state by means of the second game progress means such that the first progress state does not end until the second event information reception means receives the second event information for determining the second progress state.

In other words, the progress rate of the first progress state in the first terminal device is caused to be lower than the progress rate of the first progress state in the second terminal device such that the first progress state does not end until the second event information for determining the second progress state is received, meaning that the first user using the first terminal device is able to see a state in which the first progress state changes sequentially. As a result, it is possible to cause a network game to progress smoothly, without causing the first user visual discomfort.

The present invention may further include the following feature that the network game includes a baseball game in which a batter character bats a ball object pitched by a pitcher character in a game space; the first user uses the first terminal device to operate the pitcher character; the second user uses the second terminal device to operate the batter character; the first event information comprises pitch information for determining the movement of the ball object pitched by the pitcher character; the second event information comprises batting information for determining a batting result of the batter character; and the first game progress means causes a progress rate of a pitching action of the pitcher character to be lower than a progress rate of a pitching action of the pitcher character by means of the second game progress means such that a batting action of the batter character does not begin until the second event information reception means receives the batting information.

According to the present invention with the above features, the network game includes a baseball game in which a batter character bats a ball object pitched by a pitcher character in a game space; the first user uses the first terminal device to operate the pitcher character; the second user uses the second terminal device to operate the batter character; the first event information comprises pitch information for determining the movement of the ball object pitched by the pitcher character; the second event information comprises batting information for determining a batting result of the batter character; and the first game progress means causes a progress rate of a pitching action of the pitcher character to be lower than a progress rate of a pitching action of the pitcher character by means of the second game progress means such that a batting action of the batter character does not begin until the second event information reception means receives the batting information.

In other words, the progress rate of a pitching action of the pitcher character in the first terminal device is caused to be lower than a progress rate of a pitching action of the pitcher character in the second terminal device such that a batting action of the batter character does not begin until batting information for determining a batting result of the batter character is received, meaning that the first user using the first terminal device is able to see a state in which the pitching action of the pitcher character changes sequentially. Thus, it is possible to cause a baseball game, which is played between users via a network and in which a batter character bats a ball object pitched by a pitcher character, to progress smoothly, without causing the first user visual discomfort.

The present invention may, furthermore, have the following features that the first and second terminal devices further comprise measurement means which measures a displayable frame rate with respect to a playback rate of game screens to be displayed; and display control means which displays game screens in accordance with the frame rate measured by means of the measurement means.

With the above features, the first and second terminal devices further comprise measurement means which measures a displayable frame rate with respect to a playback rate of game screens to be displayed; and display control means which displays game screens in accordance with the frame rate measured by means of the measurement means.

In other words, in the first and second terminal devices, a displayable frame rate is measured with respect to a playback rate of game screens to be displayed, and game screens are displayed in accordance with the frame rate thus measured, meaning that, even when there is a difference in hardware capacity between the first and second terminal devices, game screens can be displayed at a fixed playback rate. Thus, it is possible to cause a network game to progress smoothly without being subject to effects caused by a difference in hardware capacity.

The present invention relates also to a network game progress control method, which controls progress of a network game played in a game space by users using a network game progress control system that comprises a first terminal device, which is used by a first user; a second terminal device, which is used by a second user different from the first user; and a network game server device, which is communicably connected via a network with the first and second terminal devices, wherein the network game progress control method comprises: a first game progress step, in which the first terminal device causes a game to progress in accordance with a first progress state determined by first event information for determining a game progress state; a first event information transmission step, in which the first terminal device transmits the first event information to the network game server device; a first event information transfer step, in which the network game server device transfers first event information, which is transmitted in the first event information transmission step, to the second terminal device; a first event information reception step, in which the second terminal device receives first event information transferred in the first event information transfer step; a second game progress step in which the second terminal device causes a game to progress in accordance with a second progress state determined by second event information for determining the next game progress state after the game has been caused to progress in accordance with the first progress state determined by the first event information received in the first event information reception step; a second event information transmission step, in which the second terminal device transmits the second event information to the network game server device, a second event information transfer step, in which the network game server device transfers second event information, which is transmitted in the second event information transmission step, to the first terminal device; a second event information reception step, in which the first terminal device receives second event information transferred in the second event information transfer step; and a third game progress step, in which the first terminal device causes a game to progress such that the first progress state does not end until the second event information is received in the second event information reception step, and causes a game to progress in accordance with the second progress state after the second event information is received in the second event information reception step.

According to the present invention as described in the above, the network game progress control method, which controls progress of a network game played in a game space by users using a network game progress control system that comprises a first terminal device, which is used by a first user; a second terminal device, which is used by a second user different from the first user; and a network game server device, which is communicably connected via a network with the first and second terminal devices, comprises: a first game progress step, in which the first terminal device causes a game to progress in accordance with a first progress state determined by first event information for determining a game progress state; a first event information transmission step, in which the first terminal device transmits the first event information to the network game server device; a first event information transfer step, in which the network game server device transfers first event information, which is transmitted in the first event information transmission step, to the second terminal device; a first event information reception step, in which the second terminal device receives first event information transferred in the first event information transfer step; a second game progress step in which the second terminal device causes a game to progress in accordance with a second progress state determined by second event information for determining the next game progress state after the game has been caused to progress in accordance with the first progress state determined by the first event information received in the first event information reception step; a second event information transmission step, in which the second terminal device transmits the second event information to the network game server device, a second event information transfer step, in which the network game server device transfers second event information, which is transmitted in the second event information transmission step, to the first terminal device; a second event information reception step, in which the first terminal device receives second event information transferred in the second event information transfer step; and a third game progress step, in which the first terminal device causes a game to progress such that the first progress state does not end until the second event information is received in the second event information reception step, and causes a game to progress in accordance with the second progress state after the second event information is received in the second event information reception step.

In other words, according to the network game progress control system, in the first terminal device, a game is caused to progress in accordance with a first progress state determined by first event information for determining a game progress state; first event information is transmitted from the first terminal device to the network game server device, and the first event information thus transmitted is transferred from the network game server device to the second terminal device.

At this time, in the second terminal device, first event information, which is transferred from the network game server device, is received; the game is caused to progress in accordance with a second progress state determined by second event information for determining the next game progress state, after the game has been caused to progress in accordance with the first progress state determined by the received first event information; second event information is transmitted to the network game server device; and transmitted second event information is transferred from the network game server device to the first terminal device.

Meanwhile, in the first terminal device, the game is caused to progress such that the first progress state does not end until the second event information is received, and the game is caused to progress in accordance with the second progress state determined by the second event information after the second event information is received.

Therefore, in the first terminal device, the game is caused to progress such that the first progress state does not end until the second event information is received, and the game is caused to progress in accordance with the second progress state determined by the second event information after the second event information is received, and, consequently, even if there is a variation between the time for the transfer of first event information from the first terminal device to the second terminal device and the time for the transfer of second event information from the second terminal device to the first terminal device, which is caused by a difference in capacity between the first and second terminal devices and/or by a disparity in the data transfer rates of the communication lines used by the first and second terminal devices, in the first and second terminal devices, after the game is caused to progress in accordance with the first progress state, the game is caused to progress in accordance with the second progress state. Thus, it is possible to cause a network game between users to progress smoothly without being subject to effects caused by a data transfer rate disparity and/or a difference in hardware capacity.

Furthermore, the present invention relates to a network game progress control program for controlling progress of a network game played in a game space by users, wherein a terminal device which is communicably connected with a network game server device via a network is caused to act as: first game progress means, which causes a game to progress in accordance with a first progress state determined by first event information for determining a game progress state; first event information transmission means which transmits the first event information to another terminal device via the network and the network game server device; and second event information reception means which receives second event information, which is for determining a second progress state which is caused to progress following the first progress state, from the other terminal device via the network and the network game server device, wherein the first game progress means causes a game to progress such that the first progress state does not end until the second event information reception means receives the second event information, and causes a game to progress in accordance with the second progress state after the second event information reception means receives the second event information.

According to the present invention as defined in the above, the network game progress control program for controlling progress of a network game played in a game space by users causes a terminal device which is communicably connected with a network game server device via a network to act as: first game progress means, which causes a game to progress in accordance with a first progress state determined by first event information for determining a game progress state; first event information transmission means which transmits the first event information to another terminal device via the network and the network game server device; and second event information reception means which receives second event information, which is for determining a second progress state which is caused to progress following the first progress state, from the other terminal device via the network and the network game server device, wherein the first game progress means causes a game to progress such that the first progress state does not end until the second event information reception means receives the second event information, and causes a game to progress in accordance with the second progress state after the second event information reception means receives the second event information.

In other words, by means of a terminal device which is communicably connected with a network game server device via a network, a game is caused to progress in accordance with a first progress state determined by first event information for determining a game progress state, and the first event information is transmitted to another terminal device via the network and the network game server device.

At such time, in another terminal device, it is possible, after receiving first event information transmitted via the network and the network game server device and causing a game to progress in accordance with a first progress state determined by the received first event information, to cause a game to progress in accordance with a second progress state determined by the second event information for determining the next game progress state.

Meanwhile, in this terminal device, a game is caused to progress such that the first progress state does not end until second event information, which is for determining a second progress state which is caused to progress following the first progress state is received from the other terminal device via the network and the network game server device, and the game is caused to progress in accordance with the second progress state after the second event information is received.

Therefore, in this terminal device, the game is caused to progress such that the first progress state does not end until the second event information is received, and the game is caused to progress in accordance with the second progress state determined by the second event information after the second event information is received, and, consequently, even if there is a variation between the time for the transfer of first event information from this terminal device to the other terminal device and the time for the transfer of second event information from the other terminal device to this terminal device, which is caused by a difference in capacity between this terminal device and the other terminal device and/or by a disparity in the data transfer rates of the communication lines used by this terminal device and the other terminal device, in this terminal device and the other terminal device, after the game is caused to progress in accordance with the first progress state, the game is caused to progress in accordance with the second progress state. Thus, it is possible to cause a network game between users to progress smoothly without being subject to effects caused by a data transfer rate disparity and/or a difference in hardware capacity.

This application is based on Japanese Patent Application Serial No. 2001-196812, filed in Japan Patent Office on Jun. 28, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A network game progress control system, which causes a network baseball game, in which a batter character bats a ball object pitched by a pitcher character, played in a game space by users to progress, comprising:

a first terminal device, which is used by a first user, said first user using said first terminal device to operate the pitcher character;

a second terminal device, which is used by a second user different from said first user; and a network game server device, which is communicably connected via a network with said first and second terminal devices, and which controls progress of a game played in a game space by said first and second users using said first and second terminal devices, wherein said first terminal device comprises first game progress means that causes a game to progress in accordance with a first progress state determined by first event information for determining a game progress state, and first event information transmission means which transmits said first event information to said network game server device, and said first event information comprises pitch information for determining a movement of the ball object pitched by the pitcher character;

said network game server device comprises event information transfer means which transfers first event information, which is transmitted by said first event information transmission means, to said second terminal device;

said second terminal device comprises first event information reception means which receives first event information transferred by said event information transfer means, second game progress means which causes a game to progress in accordance with a second progress state determined by second event information for determining the next game progress state after the game has been caused to progress in accordance with the first progress state determined by the first event information received by said first event information reception means, and second event information transmission means which transmits said second event information to said network game server device, said second event information comprises batting information for determining a batting result of the batter character;

said event information transfer means transfers second event information, which is transmitted by said second event information transmission means, to said first terminal device;

said first terminal device further comprises second event information reception means which receives second event information transferred by said event information transfer means; and said first game progress means causes a pitching action of said pitcher character to be temporarily suspended such that a batting action of said batter character does not begin until said second event information reception means receives said batting information, and causes a game to progress in accordance with said second progress state after said second event information reception means receives said batting information.

2. The network game progress control system according to claim 1, wherein said first game progress means causes a progress rate of said first progress state to be lower than a progress rate of said first progress state by means of said second game progress means such that said first progress state does not end until said second event information reception means receives said second event information.

3. The network game progress control system according to claim 1, wherein said first and second terminal devices further comprise:

measurement means which measures a displayable frame rate with respect to a playback rate of game screens to be displayed; and display control means which displays game screens in accordance with the frame rate measured by means of said measurement means.

4. A network game progress control system, which causes a network game played in a game space by users to progress, comprising:

a first terminal device, which is used by a first user;

a second terminal device, which is used by a second user different from said first user; and a network game server device, which is communicably connected via a network with said first and second terminal devices, and which controls progress of a game played in a game space by said first and second users using said first and second terminal devices, wherein said first terminal device comprises first game progress means that causes a game to progress in accordance with a first progress state determined by first event information for determining a game progress state, and first event information transmission means which transmits said first event information to said network game server device;

said network game server device comprises event information transfer means which transfers first event information, which is transmitted by said first event information transmission means, to said second terminal device;

said second terminal device comprises first event information reception means which receives first event information transferred by said event information transfer means, second game progress means which causes a game to progress in accordance with a second progress state determined by second event information for determining the next game progress state after the game has been caused to progress in accordance with the first progress state determined by the first event information received by said first event information reception means, and second event information transmission means which transmits said second event information to said network game server device;

said event information transfer means transfers second event information, which is transmitted by said second event information transmission means, to said first terminal device;

said first terminal device further comprises second event information reception means which receives second event information transferred by said event information transfer means; and said first game progress means causes a game to progress such that said first progress state does not end until said second event information reception means receives said second event information, and causes a game to progress in accordance with said second progress state after said second event information reception means receives said second event information, wherein:

said first game progress means causes a progress rate of said first progress state to be lower than a progress rate of said first progress state by means of said second game progress means such that said first progress state does not end until said second event information reception means receives said second event information;

said network game includes a baseball game in which a batter character bats a ball object pitched by a pitcher character in a game space;

said first user uses said first terminal device to operate the pitcher character;

said second user uses said second terminal device to operate the batter character;

said first event information comprises pitch information for determining the movement of the ball object pitched by the pitcher character;

said second event information comprises batting information for determining a batting result of the batter character; and said first game progress means causes a progress rate of a pitching action of said pitcher character to be lower than a progress rate of a pitching action of said pitcher character by means of said second game progress means such that a batting action of said batter character does not begin until said second event information reception means receives said batting information.

5. A network game progress control method, which controls progress of a network baseball game, in which a batter character bats a ball object pitched by a pitcher character, played in a game space by users using a network game progress control system that comprises a first terminal device, which is used by a first user; a second terminal device, which is used by a second user different from said first user; and a network game server device, which is communicably connected via a network with said first and second terminal devices, wherein said network game progress control method comprises:

a first game progress step, in which said first terminal device causes a game to progress in accordance with a first progress state determined by first event information for determining a game progress state;

a first event information transmission step, in which said first terminal device transmits said first event information to said network game server device;

a first event information transfer step, in which said network game server device transfers first event information, which is transmitted in said first event information transmission step, to said second terminal device, said first event information comprising pitch information for determining a movement of the ball object pitched by the pitcher character;

a first event information reception step, in which said second terminal device receives first event information transferred in said first event information transfer step;

a second game progress step in which said second terminal device causes a game to progress in accordance with a second progress state determined by second event information for determining the next game progress state after the game has been caused to progress in accordance with the first progress state determined by the first event information received in said first event information reception step, said second event information comprising batting information for determining a batting result of the batter character;

a second event information transmission step, in which said second terminal device transmits said second event information to said network game server device, a second event information transfer step, in which said network game server device transfers second event information, which is transmitted in said second event information transmission step, to said first terminal device;

a second event information reception step, in which said first terminal device receives second event information transferred in said second event information transfer step; and a third game progress step, in which said first terminal device causes a pitching action of said pitcher character to be temporarily suspended such that a batting action of said batter character does not begin until said batting information is received in said second event information reception step, and causes a game to progress in accordance with said second progress state after said batting information is received in said second event information reception step.

6. A network game progress control method according to claim 5, wherein said third game progress step includes temporarily suspending the pitching action of said pitcher character after said pitching action has begun.

7. A network game progress control method according to claim 5, wherein said third game progress step includes lowering a progress rate of the pitching action of said pitcher character such that the pitching action changes sequentially at a slower than normal rate.

8. A network game progress control method according to claim 5, wherein said first event information transmission step includes:

storing set ball-type and course information; and transmitting the set ball-type and course information via the network to the network game server device.

9. A network game progress control method according to claim 8, wherein said second game progress step includes sequentially displaying game screens corresponding to the ball-type information.

10. A recording medium which stores a network game progress control program for controlling progress of a network baseball game, in which a batter character bats a ball object pitched by a pitcher character, played in a game space by users, wherein a terminal device which is communicably connected with a network game server device via a network is caused to act as:

first game progress means, which causes a game to progress in accordance with a first progress state determined by first event information for determining a game progress state, said first event information comprising pitch information for determining a movement of the ball object pitched by the pitcher character;

first event information transmission means which transmits said first event information to another terminal device via said network and said network game server device; and second event information reception means which receives second event information, which is for determining a second progress state which is caused to progress following said first progress state, from said other terminal device via said network and said network game server device, said second event information comprising batting information for determining a batting result of the batter character;

wherein said first game progress means causes a pitching action of said pitcher character to be temporarily suspended such that a batting action of said batter character does not begin until said second event information reception means receives said batting information, and causes a game to progress in accordance with said second progress state after said second event information reception means receives said batting information.

* * * * *